(12) United States Patent  
Hughes et al.

(10) Patent No.: US 8,769,265 B1
(45) Date of Patent: *Jul. 1, 2014

(54) METHOD AND SYSTEM FOR PROVIDING PERSISTENCE IN A SECURE NETWORK ACCESS

(71) Applicant: F5 Networks, Inc., Seattle, WA (US)

(72) Inventors: John R. Hughes, Seattle, WA (US); Richard Roderick Masters, Seattle, WA (US); Robert George Gilde, Issaquah, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,487

(22) Filed: Mar. 4, 2013

Related U.S. Application Data

(60) Continuation of application No. 13/176,574, filed on Jul. 5, 2011, now Pat. No. 8,407,771, which is a continuation of application No. 12/234,592, filed on Sep. 19, 2008, now Pat. No. 7,996,886, which is a division of application No. 10/234,416, filed on Sep. 3, 2002, now Pat. No. 7,430,755.

(51) Int. Cl.
*H04L 29/06* (2006.01)
*G06F 21/00* (2013.01)

(52) U.S. Cl.
CPC ............... G06F 21/00 (2013.01); H04L 63/08 (2013.01)
USPC ............... 713/156; 713/182; 726/14; 726/22

(58) Field of Classification Search
CPC ............................... H04L 63/08; G06F 21/00
See application file for complete search history.

(56) References Cited

U.S. PATENT DOCUMENTS

| | | | |
|---|---|---|---|
| 3,950,735 A | 4/1976 | Patel |
| 4,644,532 A | 2/1987 | George et al. |
| 4,965,772 A | 10/1990 | Daniel et al. |
| 5,023,826 A | 6/1991 | Patel |

(Continued)

FOREIGN PATENT DOCUMENTS

| | | |
|---|---|---|
| EP | 0 744 850 A2 | 11/1996 |
| WO | 91/14326 A2 | 9/1991 |

(Continued)

OTHER PUBLICATIONS

"AC200 and AC300—Release 2.0 Bandwidth Management Solutions," Allot Communications, Inc., Nov. 6, 1998, 5 pp.

(Continued)

*Primary Examiner* — Pramila Parthasarathy
(74) *Attorney, Agent, or Firm* — John W. Branch; Lowe Graham Jones PLLC

(57) ABSTRACT

A system and method for providing persistence in a secure network access by using a client certificate sent by a client device to maintain the identity of a target. A security handshake is performed with a client device to establish a secure session. A target is determined. A client certificate is associated with the target. During subsequent secure sessions, the client certificate is used to maintain persistent communications between the client and a target. A session ID can be used in combination with the client certificate, by identifying the target based on the session ID or the client certificate, depending on which one is available in a client message.

20 Claims, 10 Drawing Sheets

(56) References Cited

U.S. PATENT DOCUMENTS

| | | |
|---|---|---|
| 5,053,953 A | 10/1991 | Patel |
| 5,166,931 A | 11/1992 | Riddle |
| 5,299,312 A | 3/1994 | Rocco, Jr. |
| 5,319,638 A | 6/1994 | Lin |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,825,890 A | 10/1998 | Elgamal et al. |
| 5,826,242 A | 10/1998 | Montulli |
| 5,835,724 A | 11/1998 | Smith |
| 5,848,412 A | 12/1998 | Rowland et al. |
| 5,862,325 A | 1/1999 | Reed et al. |
| 5,867,495 A | 2/1999 | Elliott et al. |
| 5,875,296 A | 2/1999 | Shi et al. |
| 5,892,914 A | 4/1999 | Pitts |
| 5,919,247 A | 7/1999 | Van Hoff et al. |
| 5,936,939 A | 8/1999 | Des Jardins et al. |
| 5,946,690 A | 8/1999 | Pitts |
| 5,949,885 A | 9/1999 | Leighton |
| 5,959,990 A | 9/1999 | Frantz et al. |
| 5,961,606 A | 10/1999 | Talluri et al. |
| 5,963,915 A | 10/1999 | Kirsch |
| 5,974,460 A | 10/1999 | Maddalozzo, Jr. et al. |
| 5,983,281 A | 11/1999 | Ogle et al. |
| 5,991,878 A | 11/1999 | McDonough et al. |
| 6,006,259 A | 12/1999 | Adelman et al. |
| 6,006,260 A | 12/1999 | Barrick, Jr. et al. |
| 6,006,264 A | 12/1999 | Colby et al. |
| 6,014,710 A | 1/2000 | Talluri et al. |
| 6,026,452 A | 2/2000 | Pitts |
| 6,028,857 A | 2/2000 | Poor |
| 6,041,357 A | 3/2000 | Kunzelman et al. |
| 6,047,268 A | 4/2000 | Bartoli et al. |
| 6,051,169 A | 4/2000 | Brown et al. |
| 6,052,785 A | 4/2000 | Lin et al. |
| 6,061,454 A | 5/2000 | Malik et al. |
| 6,076,108 A | 6/2000 | Courts et al. |
| 6,078,956 A | 6/2000 | Bryant et al. |
| 6,085,234 A | 7/2000 | Pitts et al. |
| 6,088,717 A | 7/2000 | Reed et al. |
| 6,092,196 A | 7/2000 | Reiche |
| 6,098,093 A | 8/2000 | Bayeh et al. |
| 6,101,482 A | 8/2000 | DiAngelo et al. |
| 6,108,703 A | 8/2000 | Leighton et al. |
| 6,111,876 A | 8/2000 | Frantz et al. |
| 6,134,592 A | 10/2000 | Montulli |
| 6,138,142 A | 10/2000 | Linsk |
| 6,161,139 A | 12/2000 | Win et al. |
| 6,163,806 A | 12/2000 | Viswanathan et al. |
| 6,170,017 B1 | 1/2001 | Dias et al. |
| 6,182,142 B1 | 1/2001 | Win et al. |
| 6,185,567 B1 | 2/2001 | Ratnaraj et al. |
| 6,185,598 B1 | 2/2001 | Farber et al. |
| 6,209,038 B1 | 3/2001 | Bowen et al. |
| 6,212,565 B1 | 4/2001 | Gupta |
| 6,223,287 B1 | 4/2001 | Douglas et al. |
| 6,225,995 B1 | 5/2001 | Jacobs et al. |
| 6,226,750 B1 | 5/2001 | Trieger |
| 6,247,050 B1 | 6/2001 | Tso et al. |
| 6,247,056 B1 | 6/2001 | Chou et al. |
| 6,253,230 B1 | 6/2001 | Couland et al. |
| 6,266,335 B1 | 7/2001 | Bhaskaran |
| 6,272,523 B1 | 8/2001 | Factor |
| 6,279,001 B1 | 8/2001 | DeBettencourt et al. |
| 6,317,786 B1 | 11/2001 | Yamane et al. |
| 6,327,609 B1 | 12/2001 | Ludewig et al. |
| 6,330,566 B1 | 12/2001 | Durham |
| 6,334,114 B1 | 12/2001 | Jacobs et al. |
| 6,345,288 B1 | 2/2002 | Reed et al. |
| 6,345,303 B1 | 2/2002 | Knauerhase et al. |
| 6,351,775 B1 | 2/2002 | Yu |
| 6,360,262 B1 | 3/2002 | Guenthner et al. |
| 6,360,270 B1 | 3/2002 | Cherkasova et al. |
| 6,367,009 B1 | 4/2002 | Davis et al. |
| 6,374,300 B2 | 4/2002 | Masters |
| 6,374,359 B1 | 4/2002 | Shrader et al. |
| 6,385,642 B1 | 5/2002 | Chlan et al. |
| 6,389,462 B1 | 5/2002 | Cohen et al. |
| 6,397,253 B1 | 5/2002 | Quinlan et al. |
| 6,415,322 B1 | 7/2002 | Jaye |
| 6,421,768 B1 | 7/2002 | Purpura |
| 6,424,992 B2 | 7/2002 | Devarakonda et al. |
| 6,430,618 B1 | 8/2002 | Karger et al. |
| 6,438,597 B1 | 8/2002 | Mosberger et al. |
| 6,446,117 B1 | 9/2002 | Gebauer |
| 6,453,353 B1 | 9/2002 | Win et al. |
| 6,460,071 B1 | 10/2002 | Hoffman |
| 6,460,079 B1 | 10/2002 | Blumenau |
| 6,470,389 B1 | 10/2002 | Chung et al. |
| 6,473,802 B2 | 10/2002 | Masters |
| 6,490,624 B1 | 12/2002 | Sampson et al. |
| 6,490,679 B1 | 12/2002 | Tumblin et al. |
| 6,510,464 B1 | 1/2003 | Grantges, Jr. et al. |
| 6,557,038 B1 | 4/2003 | Becker et al. |
| 6,584,567 B1 | 6/2003 | Bellwood et al. |
| 6,587,959 B1 | 7/2003 | Sjolander et al. |
| 6,594,260 B1 | 7/2003 | Aviani, Jr. et al. |
| 6,594,692 B1 | 7/2003 | Reisman |
| 6,643,701 B1 | 11/2003 | Aziz et al. |
| 6,674,717 B1 | 1/2004 | Duong-van et al. |
| 6,681,327 B1 | 1/2004 | Jardin |
| 6,718,388 B1 | 4/2004 | Yarborough et al. |
| 6,772,333 B1 | 8/2004 | Brendel |
| 6,970,933 B1 | 11/2005 | Masters |
| 7,036,010 B2 | 4/2006 | Wray |
| 7,043,632 B2 * | 5/2006 | Chapman et al. ............. 713/153 |
| 7,047,301 B2 | 5/2006 | Skene et al. |
| 7,080,158 B1 | 7/2006 | Squire |
| 7,149,892 B2 | 12/2006 | Freed et al. |
| 7,321,926 B1 * | 1/2008 | Zhang et al. ................. 709/220 |
| 7,340,532 B2 | 3/2008 | Swildens |
| 7,430,755 B1 * | 9/2008 | Hughes et al. .................... 726/3 |
| 7,996,886 B1 * | 8/2011 | Hughes et al. .................... 726/6 |
| 8,407,771 B1 * | 3/2013 | Hughes et al. .................... 726/6 |
| 2002/0007413 A1 | 1/2002 | Garcia-Luna-Aceves et al. |
| 2003/0097592 A1 | 5/2003 | Adusumilli |
| 2005/0063303 A1 | 3/2005 | Samuels et al. |
| 2005/0074007 A1 | 4/2005 | Samuels et al. |
| 2005/0108420 A1 | 5/2005 | Brown et al. |
| 2005/0187979 A1 | 8/2005 | Christensen et al. |
| 2005/0265235 A1 | 12/2005 | Accapadi et al. |

FOREIGN PATENT DOCUMENTS

| | | |
|---|---|---|
| WO | 95/05712 A2 | 2/1995 |
| WO | 97/09805 A1 | 3/1997 |
| WO | 97/45800 A1 | 12/1997 |
| WO | 99/05829 A1 | 2/1999 |
| WO | 99/06913 A1 | 2/1999 |
| WO | 99/10858 A2 | 3/1999 |
| WO | 99/39373 A2 | 8/1999 |
| WO | 99/64967 A1 | 12/1999 |
| WO | 00/04422 A2 | 1/2000 |

(56) References Cited

FOREIGN PATENT DOCUMENTS

| WO | 00/04458 A1 | 1/2000 |
|---|---|---|
| WO | 0169890 A1 | 9/2001 |

OTHER PUBLICATIONS

"Adding Scalability and Availability to TCP/IP Services," Coyote Point Systems, Inc., Sunnyvale, California, 1998, 4 pp.
"Balancing User-Request Loads," Chapter 13, Netscape Communications Corp., 1999, 10 pp.
"Be Free Handles a Billion Online Impressions Per Quarter with Coyote Point's Equalizer Load Balancer," Coyote Systems, Inc., 2003, 4 pp.
"Choosing the Right SSL Acceleration Device for Your E-Business," F5 Networks, 2003, 10 pp.
"Coyote Point's Adaptive Load Balancer, the Equalizer to Work in Tandem with Bright Tiger's ClusterCATS Web Site Resource Management Software," Coyote Point Systems, Jan. 4, 1999, 3 pp.
"Creating and Managing User Sessions," 1999, Netscape Communications Corp., 5 pp.
"Distributed Traffic Management," Central Dispatch Data Sheet, Resonate, Inc., 1999, 2 pp.
"Enabling the Information Age," Web Application Server 4.0, Oracle, date unknown, 18 pp.
"Equalizer," Coyote Point Systems, Inc., publication unknown, 2003, 2 pp.
"Getting Started," IBM WebSphere Performance Pack for Multiplatforms, Version 3.0, International Business Machines Corporation, Aug. 1999, 107 pp.
"IBM WebSphere Application Server Version 3.0.2,2 Release Notes," Updated Dec. 8, 2000, 33 pp.
"Maximum Performance with Fine-Grained Control: A Requirement for E-Business Applications Applications and Services," Whitepaper, Resonate, Inc., Aug. 1999, 10 pp.
"Networkers," Cisco Systems, Inc., 2001, 47pp.
"Persistent Client State HTTP Cookies," Netscape Communications Corp., 1999, 5 pp.
"Proposals for Gathering Consumer Demographics," publication unknown, Oct. 1995, 5 pp.
"Resonate Introduces Resonate Dispatch, A Distributed Server Management Solution for Multi-Server Internet/Intranet Sites," News Release by Resonate, Inc., dec. 9, 1996, 3 pp.
"Review Guide," IBM WebSphere Performance Pack for Multiplatforms, Version 2.0, International Business Machines Corporation, Mar. 1999, 32 pp.
"Session Tracking," Chapter 9, Prentice Hall and Sun Microsystems, date unknown, 30 pp.
"Sprint Introduces Global Internet VPN Service," A Daily Journal for Broadband Networking, ATM News, Inc., 1999, 3 pp.
"The Next Step in Server Load Balancing," Alteon Web Systems, Inc. San Jose, California, White Paper dated Nov. 1999, 15 pp.
"WebOS 8.3 Feature Overview," Alteon Web Systems, undated Confidential slide presentation, 27 pp.
"WebOS 9.0," Alteon Web Systems, undated Confidential slide presentation, 16 pp.
"Why do SSL connections to IE browsers periodically time out," Question 8.2, Zeus Technology, Aug. 12, 2005, 5 pp.
Abdelzaher, Tarek F. et al., "Web Server QoS Management by Adaptive Content Delivery," publication unknown, 1999, 10 pp.
About Computing & Technology, "Wireless/Networking, Nagle Algorithm," visited Dec. 6, 2005, 2 pages, http://compunetwroking.about.com/od/1/bldef_nagle.htm.
Acuitive, Inc. Virtual Resource Management: Industry Update and Analysis, Research Report 00001, Mar. 2000, p. 37 and p. 47.
Acuitive, Inc. Virtual Resource Management: Industry Update and Analysis. Product Version 1.0, Mar. 2000, 47 Pages.
Acuitive, Inc. Virtual Resource Management: Which Vendor is Right for You? Product Version 3.0, Mar. 2000, 136 Pages.
Anderson, Paul and James, Gail. Performance Soars, Features Vary. Network World Fusion. Jun. 14, 1999, 5 Pages. www.nwfusion.com.
Andresen, Daniel et al., "Towards a Scaleable Distributed WWW Server on Workstation Clusters," publication unknown, 1997, 16 pp.
Arrowpoint Communications. A Comparative Analysis of Web Switching Architectures. 12 Pages. www.arrowpoint.com/switch/index.html, undated.
Arrowpoint Communications. A Comparative Analysis of Web Switching Architectures. Jun. 2000. Abstracts (2 Pages) and Article (12 Pages). www.knowware.co.uk.com.
Arrowpoint Communications. ArrowPoint and Cube Technologies Team to Deliver 100% Uptime and E-Transaction Services . . . Business Wire. Apr. 12, 1999, 3 Pages, Westford, MA.
Arrowpoint Communications. Arrowpoint Communications Wins 1999 Hot Product Award from Data Communications Magazine. Press Release, Jan. 8, 1999, 1 Page, Westford, MA.
Arrowpoint Communications. ArrowPoint—When Web Performance is Your Business. Internetweek.com. Oct. 21, 1999 4 Pages. www.internetwk.com.
Arrowpoint Communications. Frequently Asked Questions (about ArrowPoint Communications). Feb. 14, 2003, 3 Pages. www.knowware.co.uk.com.
Australia's Academic Research network, "Programs and Large MTU, Nagle Algorithm," visited Dec. 9, 2005, 3 pages, www.aarnet.edu.au/engineering/networkdesign/rntu/programming.html.
Babir, A. et al., "Known CN Request-Routing Mechanisms," Nortel Networks et al., Network Working Group, Internet Draft, Apr. 3, 2003, 22 pp.
Berners-Lee, T. et al., RFC 1945, "Hypertext Transfer Protocol—HTTP/1.0." May 1996, 51 pages.
Bhatti, Nina et al., "Web Server Support for Tiered Services," Hewlett-Packard Research Labs, Palo Alto, California, Network, IEEE, vol. 13, Issue 5, Sep./Oct. 1999, 16 pp.
Bizyayev, Slava, "Tutorials: Building a Large-Scale E-commerce site with Apache and moo-perl," publication unknown, Mar. 15, 2004, 106 pp.
Brooks, Charles et al., "Application-Specific Proxy Servers as HTTP Stream Tranducers," Proceedings of the Fourth International World Wide Web Conference, 1995, 9 pp.
Brooks, Roseann, Mcgrath. Sapphire/Web: Gem of an Integration Solution. ENT. May 20, 1998, 2 pp., vol. 9, No. 3.
Canover, Joel. ArrowPoint CSS-100 Switch: Layer-By-Layer Load Balancing. Nov. 11, 2002. 3 Pages. www.networkcomputing.com.
Cardellini, Valeria et al., "Dynamic Load Balancing on Web-server Systems," IEEE Internet Computing, IEEE, vol. 3, Nov. 3, 1999, 24 pp.
Cardellini, Valeria et al., "The State of the Art in Locally Distributed Web-Sever Systems," ACM Computing Suveys, vol. 34, No. 2, Jun. 2002, 49 pp.
Caruso, Jeff, "Vendors up load-balancing ante," Network World, Inc., Nov. 15, 1999, 4 pp.
Caruso, Jeff. Cookies Are the Rage in Load-Balancing Switches. Network World Fusion, Jan. 26, 2000, pp. 3 of 6. www.nwfusion.com.
Caruso, Jeff. Foundry Extends Server Load-Balancing Reach. Network World Fusion. Jan. 17, 2000, pp. 2 of 6. www.nwfusion.com.
Cherkasova, Ludmilla, "FLEX: Design and Management Strategy for Scaleable Web Hosting Service," Hewlett-Packard Company, 1999, 38 pp.
Chow, Edward, "Advanced Load Balancing/Web Systems," Department of Computer Science, University of Colorado at Colorado Springs, Jun. 21, 2000, 82 pp.
Chu, Chi, "IP Cluster," Research 2000, Inc., Aug. 1996, 7 pp.
CISCO. How ArrowPoint Cookies Function on the CSS 11000 Series In 4.x Code. Nov. 7, 2002. 9 Pages. www.cisco.com.
Damani, Om P. et al., "ONE-IP: techniques for hosting a service on a cluster of machines," Computer Networks and ISDN Systems 29 (1997), Elsevier Science B.V., 1997, pp. 1019-1027. (9 pages) Cited by 12 patents [ISI abstract].
Dierks, T. et al., "RFC 2246, The TLS Protocol, Version 1.0" Jan. 1999, 80 pages.
Doyle, Michelle et al., "On balacing client-server load in intelligent web-based applications involving dialog," Department of Computer Science, Trinity College Dublin 2 Ireland, Apr. 1999, 28 pp.

(56) References Cited

OTHER PUBLICATIONS

Eddy, Andy. ArrowPoint Targets Overloaded Server Farms. Network World. Apr. 13, 1998, 3 Pages. www.nwfusion.com.

Email from Josh Hildebrand to Rob Glide, F5 Networks, dated Sep. 10, 1998, 3 pp.

Engelschall, Ralf S., "Load Balancing Your Web Site," Web Techniques Magazine, vol. 3, Issue 5, May 1998, 8 pp.

Fielding, R., et al., "RFC 2068, Hypertext Transfer Protocol—HTTP/1.1," Network Working Group, Request for Comments: 2068, Category: Standards Track, Internet RFC/STD/FYI/BCP Archives, Jan. 1997, 115 pp.

Fielding, R. et al, RFC 2616, "Hypertext Transfer Protocol—HTTP/1.1," Jun. 1999, 114 pages.

Fifi.org, "Manpage of TCP," visited Dec. 9, 2005, 6 pages, http://www.fifi.org/cgi-bin/man2html/usr/share/man/man7/tcp.7.gz.

Freier, A. et al., Netscape Communications Corporation, "The SSL Protocol, Version 3.0," Mar. 1996, 60 pages.

Fox, Armando et al., "Experience With Top Gun Wingman: A Proxy-Based Graphical Web Browser for the 3Com PalmPilot," University of California at Berkley, publication unknown, 1998, 18 pp.

Gage, Christopher. IBM SecureWay Network Dispatcher Version 2.1: Scalability, Availability, and Load-Balancing for TCP/IP Applications. Apr. 1999, 2 Pages, North Carolina.

Gage, Christopher. SecureWay Network Dispatcher Version 2.1: Scaleability, Availability and Load-Balancing for TCP/IP Applications. IBM, Apr. 1999, 15 Pages, South Carolina.

Goldszmidt, G. et al,. "NetDispatcher: A TCP Connection Router," IBM Research Report, IBM Research Division, Yorktown Heights, New York, May 19, 1997, 32 pp.

Goldszmidt, G., "Load Management for Scaling up Internet Services," IEEE, 1998, pp. 828-835.

Hallam-Baker, P. et al., "Session Identification URI," W3C Working Draft, WD-session-id-960221, 1996, 7 pp.

Harbaugh, Logan G. Balancing the Load. Internetweek.com Jan. 25, 1999, 9 Pages. www.internetwk.com.

Herringshaw, Chris, "Tuning Web Site Performance," excerpted from Network Magazine, Nov. 15, 1997, 3 pp.

Housley, R. et al., The Internet Society, RFC 2401, "Security Architecture for the Internet Protocol," Nov. 1998, 59 pages.

Hunt, Guerney D.H. et al., "Network Dispatcher: a connection router for scalable Internet services," 1998, 11 pp.

Hunt, Guerney et al., "Enabling Content-Based Load Distribution for Scalable Services," publication unknown, 1997, 5 pp.

IBM U.S. Announcement Letter. IBM WebSphere Performance Pack Delivers Quality Service with Enhanced Functions. Mar. 16, 1999, 13 Pages. www.ibmlink.ibm.com.

IBM. About IBM Network Dispatcher Features. Sep. 23, 2003. 4 Pages. mhtml: file://M:\'802%20patent%20 (cookie%)persistence)\Related%20art%20research.com.

IBM. User'Guide: SecureWay Network Dispatcher; Version 2.1 for AIX, Solaris, and Windows NT. Mar. 1999, 84 Pages.

Infoliberia, Inc. ArrowPoint and InfoLibria Announce Scalable Solution to Improve Web Performance and Availiblity. Press Release, Jun. 2, 1999. 3 Pages. Westford, MA.

Kent, S. et al., "The Internet Society, RFC 2401, security Architecture for the Internet Protocol," Nov. 1998, 59 pages.

Kessler, G. et al., RFC 1739, "A Primer on Internet and TCP/IP Tools," Dec. 1994, 46 pages.

Kristol, D. et al., "HTTP State Management Mechanism," Bell Laboratories et al., Network Working Group, Request for Comments: 2109, Category: Standards Track, Feb. 1997, 21 pp.

Kristol, David M., "HTTP Cookies:Standards, Privacy and Politics," Lucent Technologies, 2001, 49 pp.

Kristol, David M., "HTTP Proxy State Management Mechanism," Bell Laboratories, Lucent Technologies, HTTP Working Group, Internet Draft, May 26, 1998, 6 pp.

Kristol, David M., "Proposed HTTP State-Info Mechanism," AT&T Bell Laboratories, HTTP Working Group, Internet Draft Sep. 22, 1995, 8 pp.

Lavole, B. et al., "Web Characterization Terminology & Definitions Sheet," W3C Working Draft, May 24, 1999, 12 pp.

Lin, Wei-Jyh and Chen, Kung. A Database Application Generator for the WWW. Journal of the Chinese Institute of Engineers. 1998. pp. 337-345. vol. 21, No. 3.

Lucent Technologies. Lucent Signs OEM Agreement for ArrowPoint Web Switches. Press Release. Apr. 26, 1999. 3 Pages. Westford, MA.

Mogul, Jeffrey C., "The Case for Persistent-Connection HTTP," SIGCOMM '95, Cambridge, Massachusetts, 1995, pp. 299-313.

Moore, Keith, "Applicability Statement for HTTP State Management," University of Tenessee, Network Working Group, Internet Draft, Nov. 18, 1998, 7 pp.

Nagle, J., RFC 896, "Congestion ontrol in IP/TCP internetworks," Jan. 6, 1984, 13 pages.

Network Applicance. ArrowPoint Communications And Network Applicance Team to Optimize Web Caches and Scaleable. Press Release. Nov. 16, 1998. 2 Pages. Westford, MA.

Network World Fusion. Response to Load-Balancing RFP: ArrowPoint. Jun. 13, 1999, 5 pp, www.nwfusion.com.

OpenSSL, visited Apr. 12, 2006, 1pg, www.openssl.org.

Pai, Vivek S. et al., "Locality-Aware Request Distribution in Cluster-based Network Servers," publication unknown, 1998, 12 pp.

Paxson, V., RFC 2525, "Known TCP Implementation Problems," Mar. 1999, 61 pages.

Perrochon, Louis, "Translation Servers: Gateways Between Stateless and Stateful Information Systems," Institut for Informationsysteme, publication unknown, Nov. 1994, 11 pp.

Pistoia, Marco and Letilley, Corinne, IBM WebSphere Performance Pack Load Balancing with IBM SecureWay Network Dispatcher, SG24-5858-00. Dec. 4, 2002. 1 Page abstract.

Pistoia, Marco and Letilley, Corinne. IBM WebSphere Performance Pack Load Balancing with IBM SecureWay Network Dispatcher. Oct. 1999. pp. 1-207. www.redbooks.ibm.com.

Pistoia, Marco and Letilley, Corinne. IBM WebSphere Performance Pack: Load Balancing with IBM SecureWay Network Dispatcher. pp. 208-426. Oct. 1999. www.redbooks.ibm.com.

Rescorla, E. "SSL and TLS, Designing and Building Secure Systems," 2001, Addison-Wesley, 46 pages.

Response to Load-Balancing RFP: ArrowPoint. Network World Fusion. Jun. 13, 1999. 5 Pages. www.nwfusion.com.

Response to Load-Balancing RFP: Foundry. Network World Fusion. Jun. 13, 1999. 2 Pages. www.nwfusion.com.

Riggs, Brian. Switchmakers Aim to Make Online Shopping Easier. Information Week Online. Nov. 15, 1999. 2 Pages. www.informationweek.com.

RSA Laboratories, "PKCS #1 v2.0: RSA Cryptography Standard," Oct. 1, 1998. 35 pages.

Schemers, Roland J. III, "Ibnamed: A Load Balancing Name Server in Peri," 1995 LISA IX, Sep. 17-25, 1995, Montery, California, 11 pp.

Schroeder, Trevor et al, "Scalable Web Server Clustering Technologies,", IEEE Network, May/Jun. 2000, 8 pp.

SearchNetworking.com, "Nagle's Algorithm," visited Dec. 6, 2005, 3 pages, http://searchnetworking.techtarget.com/sDefinition/0,,sid7_gci754347,00.html.

Slide Presentation, First page titled, "Overview," HY359 (remainder of text not in English) May 4, 2004, 28 pp.

Srisuresh, P. et al., "Load Sharing using IP Network Address Translation (LSNAT)," Lucent Technologies et al., Network Working Group, Request for Comments: 2391, Category: Informational, Aug. 1998, 18 pp.

Taylor, Art. Java-Charging The Data Warehouse. Database Programming & Design. Oct. 1997. 58 Pages. vol. 10, No. 10.

Tormasov, A. et al., "TCP/IP Options for High-Performance Data Transmission," visited Dec. 9, 2005, 4 pages. http://builder.com.com/5100-6732-1050878.html.

Transcript of videotaped deposition of Daniel Matte, F5 Networks, Inc., Mar. 23, 2004, (pp. 77-88), 3 pp.

Transcript of videotaped deposition of Daniel Matte, F5 Networks, Inc., Apr. 22, 2004, (pp. 65-68), 1 pp.

Varma, Vik, "A Solution to Redundant, Load Balanced Firewall Systems," publication unknown, 1998, 6 pp.

Voigt, Thiemo et al, "Handling Persistent Connections in Overloaded Web Servers," publication unknown, 2001, 12 pp.

(56) References Cited

OTHER PUBLICATIONS

Voigt, Thiemo et al., "Handling Persistent Connections in Overloaded Web Servers," publication unknown, 2001, 2 pp.

Voigt, Thiemo et al., "Handling Persistent Connections in Overloaded Web Servers," Swedish Institute of Computer Science and Uppsala University, 2001, 17 pp.

W3C, "HTTP/1.1 and Nagle's Algorithm," visited Dec. 6, 2005, 3 pages; http://www.w3.org/Protocols/HTTP/Performance/Nagle/.

Wireless Application Protocol Forum Ltd., "Wireless Transport Layer Security, Version Apr. 6, 2001," visited Aug. 7, 2006, 106 pages, www.openmobilealliance.org/tech/affiliates/wap/wap-261-wtls-20010406-a.pdf.

Wu, Cheng. Web Switches Help Reduce Net Traffic. Network World. Mar. 29, 1999. 4 Pages. www.nwfusion.com.

Yang, Chu-Sing and Luo, Mon-Yen. Efficient Support for Content-Based Routing in Web Server Clusters. 2nd USENIX Symposium, 1999. pp. 221-232. Kaosiung, Taiwan.

Zenel, Bruce, "A Proxy Based Filtering Mechanism for the Mobile Environment," Columbia University doctoral dissertation, 1998, 234 pp.

Zimmerman, Christine, Alteon Offers a Cookie-Cutter Approach to Load Balancing. InternetWeek.com. Nov. 8, 1999. 1 Page. www.internetwk.com.

Official Communication for U.S. Appl. No. 10/234,416 mailed May 5, 2006.

Official Communication for U.S. Appl. No. 10/234,416 mailed Oct. 18, 2006.

Official Communication for U.S. Appl. No. 10/234,416 mailed Jan. 18, 2007.

Official Communication for U.S. Appl. No. 10/234,416 mailed May 8, 2007.

Official Communication for U.S. Appl. No. 10/234,416 mailed Aug. 24, 2007.

Official Communication for U.S. Appl. No. 10/234,416 mailed May 16, 2008.

Official Communication for U.S. Appl. No. 12/234,592 mailed Nov. 24, 2009.

Official Communication for U.S. Appl. No. 12/234,592 mailed May 18, 2010.

Official Communication for U.S. Appl. No. 12/234,592 mailed Nov. 18, 2010.

Official Communication for U.S. Appl. No. 12/234,592 mailed Apr. 5, 2011.

Official Communication for U.S. Appl. No. 13/176,574 mailed Aug. 14, 2012.

Official Communication for U.S. Appl. No. 13/176,574 mailed Nov. 26, 2012.

\* cited by examiner

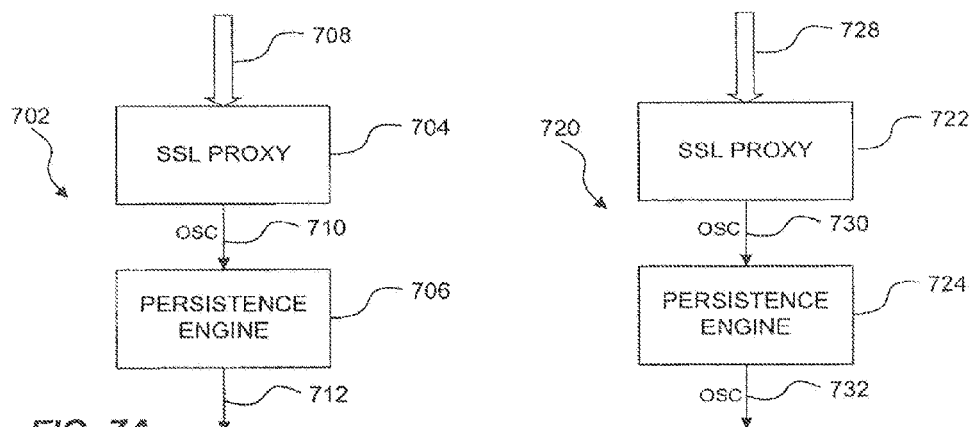
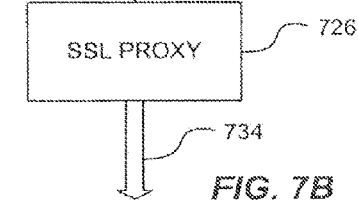
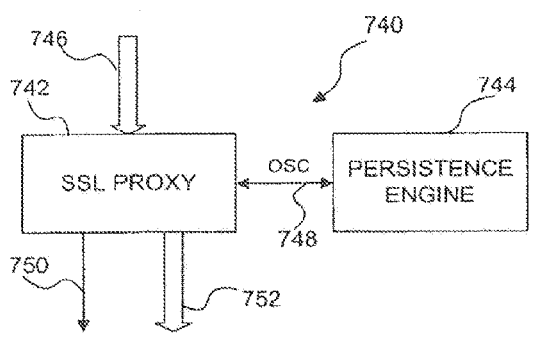
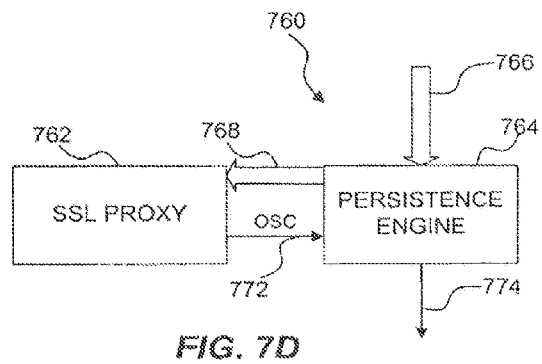

METHOD AND SYSTEM FOR PROVIDING PERSISTENCE IN A SECURE NETWORK ACCESS

CROSS-REFERENCE TO RELATED APPLICATIONS

This utility patent application is a Continuation of a U.S. patent application Ser. No. 13/176,574 filed on Jul. 5, 2011, entitled "Method And System for Providing Persistence in a Secure Network Access," which is a Continuation of U.S. patent application Ser. No. 12/234,592 filed on Sep. 19, 2008, entitled "Method And System for Providing Persistence in a Secure Network Access," which is a Divisional of U.S. patent application Ser. No. 10/234,416 filed on Sep. 3, 2002, the benefit of which are each claimed under 35 U.S.C. §120, and which are each further incorporated herein by reference in their entirety.

FIELD OF THE INVENTION

This application relates generally to distributing client requests among servers on a network, and, more specifically, to techniques for consistently distributing requests between clients and servers during secure conversations.

BACKGROUND

Many web sites on the World Wide Web (WWW) today use the Secure Sockets Layer and Transport Layer Security (SSL) protocols to achieve end-to-end secure communications, particularly in the areas of electronic commerce and financial services. The TLS protocol is derived from SSL, and is described in "The TLS Protocol, Version 1.0, RFC 2246 (January 1999)," available through the Internet Engineering Task Force (IETF). As used throughout this application, including the claims, SSL refers to SSL, TLS, and all secure communications protocols derived therefrom.

IPSecurity (IPSEC) is a set of protocols and associated algorithms designed for providing security for Internet traffic, at the IP layer. IPSEC is described in "Security Architecture for the Internet Protocol, RFC 2401 (November 1998)," available through the IETF.

The most widely used SSL-enabled protocol today is the Hypertext Transport Protocol (HTTP) encapsulated in an SSL connection, commonly known as HTTPS. The HTTP protocol is described in "Hypertext Transport Protocol (HTTP) version 1.1, RFC 2616 (June 1999)," available through the IETF. Other SSL-enabled protocols include File Transfer Protocol (FTP), Simple Mail Transfer Protocol (SMTP), Lightweight Directory Access Protocol (LDAP), TELNET, Internet Relay Chat (IRC), Internet Message Access Protocol (IMAP), and Post Office Protocol (POP).

The Wireless Application Protocol (WAP) Wireless Transport Layer Security (WTLS) protocol is applicable to wireless communications. The WAP WTLS is described in "Wireless Transport Layer Security, Version 6 Apr. 2001," available through the Open Mobile Alliance (OMA).

A digital certificate is a digital statement used for authenticating an entity. Often, the digital statement is cryptographically signed by a trusted authority. The format of one type of certificate is specified in "Internet X.509 Public Key Infrastructure Certificate and CRL Profile, RFC 2459 (January 1999)," available through the IETF. Alternative certificate formats are also available.

The Hyper Text Transfer Protocol (HTTP) is an application level protocol for transferring resources across the Internet, e.g., a network data object or server, where the resource is specified by a Uniform Resource Locator (URL). The Hyper Text Mark-up Language (HTML) is a simple data format that is used to create hypertext documents that are supported by the HTTP protocol. These standards are commonly relied upon in technology of the World Wide Web (WWW) on the Internet.

A server array controller is an Internet traffic management device. Server array controllers (hereinafter referred to simply a "controller" or "controllers") control the flow of data packets to and from an array of application servers. The controller manages and distributes Internet, intranet and other user requests across redundant arrays of network servers, regardless of the platform type. Controllers support a wide variety of network applications such as web browsing, e-mail, telephony, streaming multimedia and other network protocol traffic.

SUMMARY

These and various other features as well as advantages, which characterize the present invention, will be apparent from a reading of the following detailed description and a review of the associated drawings.

Briefly, described is a system and method for providing persistence in a secure network access by using a client certificate sent by a client device to maintain the identity of a target. The target can be a server, another type of device, or a software process. A security handshake is performed with a client device to establish a secure session. A target is determined. A client certificate is associated with the client device. During subsequent secure sessions, the client certificate is used to maintain persistent communications between the client and a target.

In one aspect of the invention, a message is received from a client device, the message including a first client certificate associated with the client device. A target for the client device is determined. A second message from the client device is received, including a second client certificate, equivalent to the first client certificate. The target is determined based on the second client security certificate.

In another aspect of the invention, after receiving the first message, at least one data message is received from the client, and the data message is forwarded to the target server. After receiving the second security message, a second data message is received from the client and forwarded to the target server.

In another aspect of the invention, a secure communication protocol handshake is performed with the client device, the handshake including the first security message. The secure communication protocol can be SSL. The handshake establishes a secure communication session.

In another aspect of the invention, a second secure communication protocol handshake is performed with the client device, the second handshake including the second security message. The second handshake can be performed within the first secure communication session.

In another aspect of the invention, an identification of the target server is sent to a traffic manager by inserting the identification into an HTTP header. This can be implemented by inserting the identification into an HTTP cookie.

In another aspect of the invention, a secure session ID is used to maintain persistence with the target server. The invention can optionally use either a session ID or a client certificate, depending on which one is available at the time of a security handshake.

In another aspect of the invention, data is stored that maps two or more of the session ID, the client certificate, and the target. The mapping is used to identify the target and to maintain persistence.

In another aspect of the invention, a load balancer communicates with more than one SSL proxy, and receives identifying data from the SSL proxies. The identifying data can be a client certificate, a session identifier, or both. The load balancer includes instructions for maintaining a persistent communications between the client server and the target server, based on the identifying data.

In another aspect of the invention, persistence is maintained when the second client certificate, equivalent to the first certificate, is received from a second client device. The client certificate can be transferred from the first client device to the second client device.

Aspects of the invention can be embodied in software and/or hardware and on a computer-readable medium and/or in a modulated data signal.

These and various other features as well as advantages, which characterize the present invention, will be apparent from a reading of the following detailed description and a review of the associated drawings.

BRIEF DESCRIPTION OF THE DRAWINGS

FIGS. 7A-D are block diagrams illustrating configurations in which the invention may be practiced;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims. The phrase "in one embodiment" as used herein does not necessarily refer to the same embodiment, though it may. As used herein, the term "or" is an inclusive "or" operator, and is equivalent to the term "and/or", unless the context clearly dictates otherwise.

Figure 1:
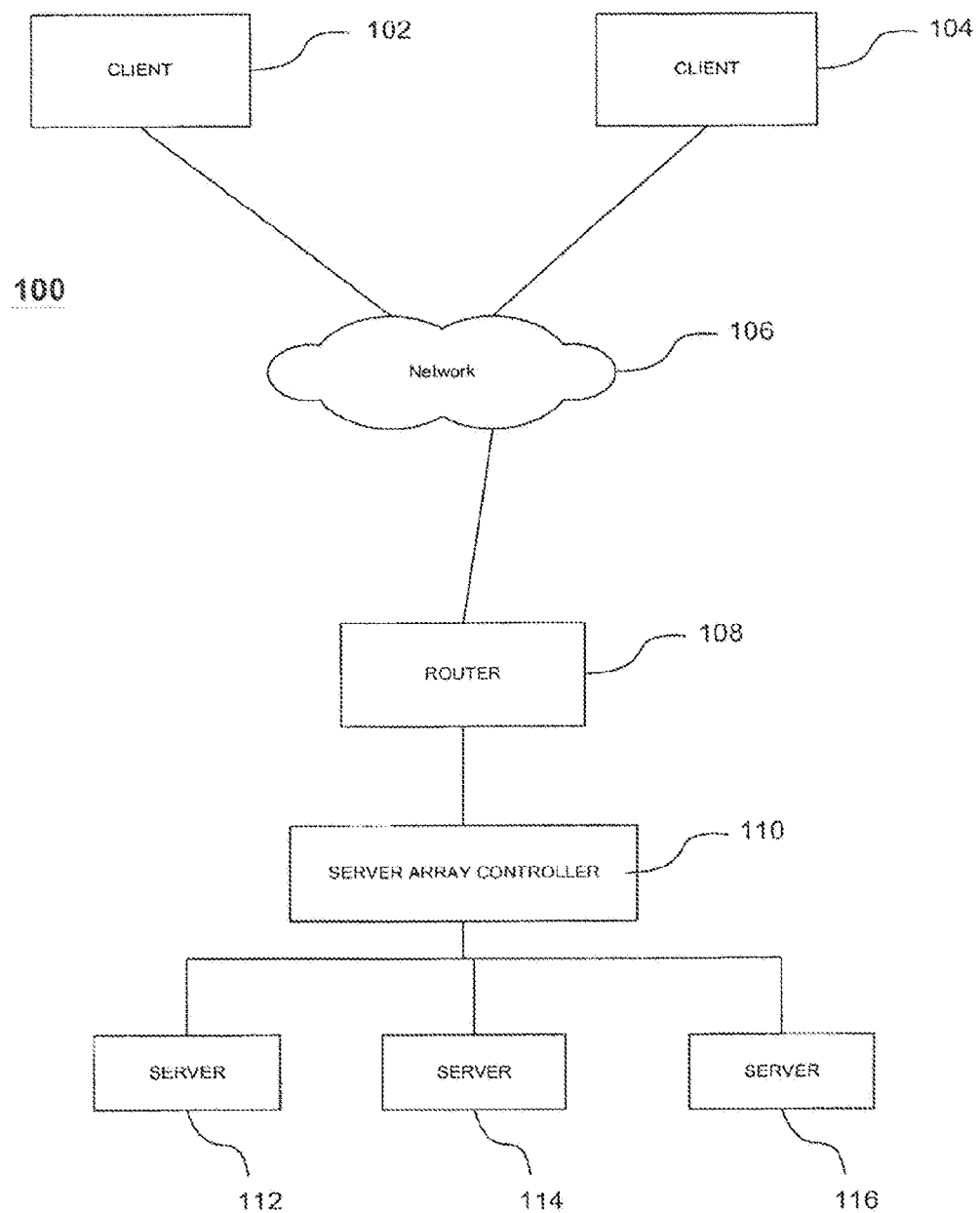
FIG. 1 is a system diagram of a computer network in which the invention may be practiced.

FIG. 1 illustrates an exemplary environment 100 in which the invention operates, according to one embodiment of die invention. The environment 100 includes a network 106. The network 106 can be a wide area network (WAN), a local area network (LAN), or a combination of interconnected WANs and LANs. The Internet is made up of a vast number of such interconnected networks, computers, and network devices that use the Transmission Control Protocol/Internet Protocol ("TCP/IP") suite of protocols to communicate with one another. The environment further includes client devices 102-104 (also referred to as clients), router 108, server array controller 110, and a server array. The server array includes servers 112-116. Network 106 couples clients 102-104 to the server array controller 110 through the router 108. Server array controller 110 couples the server array to network 106 through the router 108. An exemplary server array controller that can connect with network 106 is network device 200 of FIG. 2. A router 108 is an intermediary device on a communications network that expedites packet delivery.

Clients 102-104 are computing devices capable of connecting with network 106. The set of such devices can include devices that connect using one or more wired communications mediums, a wireless communications medium, or a combination of wired and wireless communications mediums. Clients 102-104 include such devices as personal computers, multiprocessor systems, microprocessor-based or programmable consumer electronics, network PCs, cell phones, smart phones, pagers, PDAs, Pocket PCs, wearable computers, walkie talkies, radio frequency (RF) devices, infrared (IR) devices, CBs, integrated devices combining one or more of the preceding devices, and the like.

Servers 112-116 are computing devices that provide information and/or services to clients 102-104. Servers 112-116 can, for example, store web pages or components thereof, dynamically create web pages or components thereof, store data and/or files for access by other servers or clients, or any combination of these functions.

In general, clients 102-104 are sites where a human user operates the computing device to make requests for data or services from other computers on the network. Often, the requested data resides in computing devices such as servers 112-116. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Server array controller 110 receives packets from network 106, through the router 108, and also receives packets from the servers 112-116. In some operations, server array controller 110 acts like a layer 7 switch. That is, it may look at content associated with higher TCP/IP layers of the packet, e.g. a request for an HTML page, the request including a Uniform Resource Locator (URL) and information that identifies the user, such as a cookie, etc. It can store information in memory so that the next time the requestor requests more information from the same web site each request is sent to the same server. A server array controller 110 can do this, in part, to ensure that the user is connected to the server that the user previously connected to. This helps prevent the loss of transaction data, such as items in an electronic shopping cart.

Figure 2:
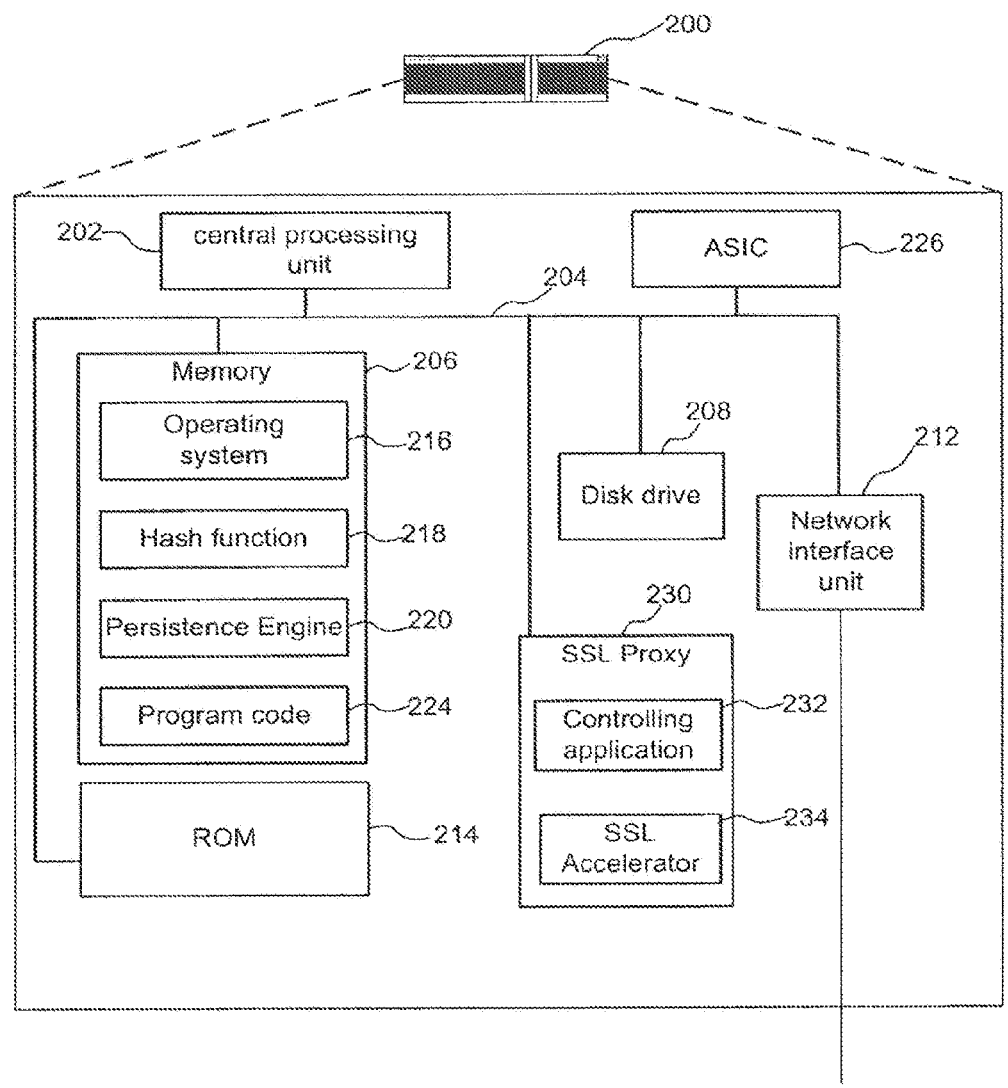
FIG. 2 is a block diagram of an exemplary network device that may be employed to perform the invention.

FIG. 2 shows an exemplary network device 200 that can operate as a server array controller in accordance with the present invention. It will be appreciated that not all components of network device 200 are illustrated, and that network device 200 can include more or fewer components than those shown in FIG. 2. Network device 200 can operate, for example, as a router, bridge, firewall, gateway, traffic management device (also referred to as a traffic manager), distributor, load balancer, server array controller, or proxy server. It is to be noted that these functions are not necessarily distinct from each other. For example, a traffic manager may perform load balancing and control an array of servers. The communications can take place over network 106 (FIG. 1), or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 106, and is constructed for use with various communication protocols, including the TCP/IP protocol. Network interface unit 212 can include or interface with circuitry and components for transmitting messages and data over a wired and/or wireless communications medium.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX®, LINUX®, or Windows®.

In one embodiment, the mass memory stores program code and data for implementing a hash function 218, and program code and data for implementing a persistence engine 220, in accordance with the present invention. The mass memory can also store additional program code 224 and data for performing the functions of network device 200.

In one embodiment, the network device 200 includes one or more Application Specific Integrated Circuit (ASIC) chips 226 connected to the bus 204. The ASIC chip 226 includes logic that performs some of the functions of network device 200. For example, in one embodiment, the ASIC chip 226 performs a number of packet processing functions, to process incoming packets. In one embodiment, the logic of the hash function 218 is performed by the ASIC chip 226. In one embodiment, the network device 200 includes one or more field-programmable gate arrays (FPGA) (not shown), instead of, or in addition to, the ASIC chip 226. A number of functions of the network device can be performed by the ASIC chip 226, by an FPGA, by the CPU 202 with the logic of program code stored in mass memory, or by any combination of the ASIC chip, the FPGA, and the CPU.

In one embodiment, the network device 200 includes an SSL proxy 230. The SSL proxy 230 can include a controlling application 232 and an SSL hardware accelerator 234. The SSL proxy can include other components, such as an SSL cryptographic toolkit (not shown). The functions of an SSL proxy 230 can be distributed between software and hardware in a number of different ways. In one embodiment, the SSL proxy is a separate network device from the server array controller. In one embodiment, a separate network device performs the functions of the persistence engine 220.

Computer storage media can include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 can also include an input/output interface (not shown) for communicating with external devices or users.

Network device 200 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades and/or devices coupled to the blade server. Network device 200 can also be implemented as a combination of blades and additional components in chassis.

The server array controller 110 (hereinafter referred to simply as a "controller") shown in FIG. 1 typically includes one or more network interfaces, and performs one or more of the operations of routing, translating, and switching packets. A controller having a single network connection is also within the scope of the present invention.

In one example of the invention, the controller is a load-balancing server array controller. In this example, the controller includes load-balancing and control logic that can be implemented in software, hardware, or a combination of software and hardware.

In one embodiment, the server array controller 110 intelligently distributes web site connections across the server array. The controller 110 can manage connections to one or multiple Internet or intranet sites, and it can support a wide variety of Internet protocols and services such as TCP/IP (transmission control protocol/Internet protocol) and HTTP. Additionally, the controller 110 can support any one or more of a suite of communications protocols that are used to connect nodes on the Internet, including HTTP, file transfer (FTP), secure sockets layer (SSL), streaming media, DNS, UDP/IP, and email (SMTP).

Referring to FIG. 1, each server 112-116 is identified by a unique identifier. The identifier can be a combination of a node address and a node port number on the intranet behind the server array controller 110, which can monitor several aspects of the servers. The identifier can be a VLAN, or other identifier. The controller 110 can load balance each connection to the intranet of servers by selecting a server to provide optimal access to a requested resource. To perform load balancing, the controller 110 employs one or more algorithms for directing network traffic to a specific server. These algorithms include random distribution, server load, and URL parsing.

If a client 102-104 connects to one server 112-116 when requesting information, it may be desirable for the client to reconnect to that same server in a second request. This is desirable, for example, during an ecommerce transaction, when a server has stored data associated with the customer, and the data is not dynamically shared with the other servers. This is often the case when a customer uses a "shopping cart" at a web site server. During a second request, if the client is connected by the controller to a second server, the second server may not have the information about the client and his shopping cart. In this situation, it is desirable that the controller bypasses the load-balancing algorithm during the second request and directs the client to the prior server. This procedure is referred to as persistence.

Figure 3A:
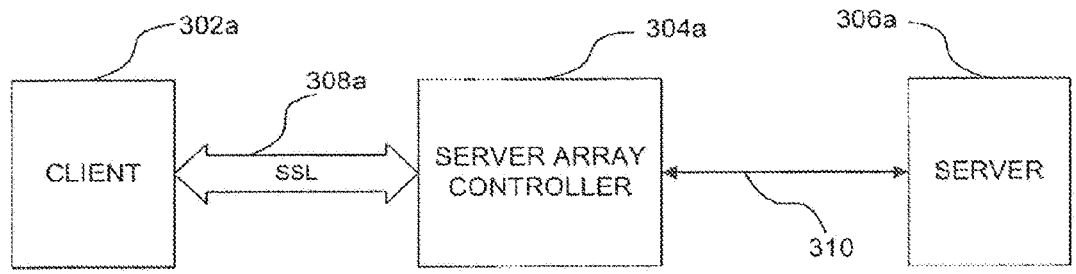
FIGS. 3A-C are block diagrams illustrating configurations in which the invention may be practiced.
Figure 3B:
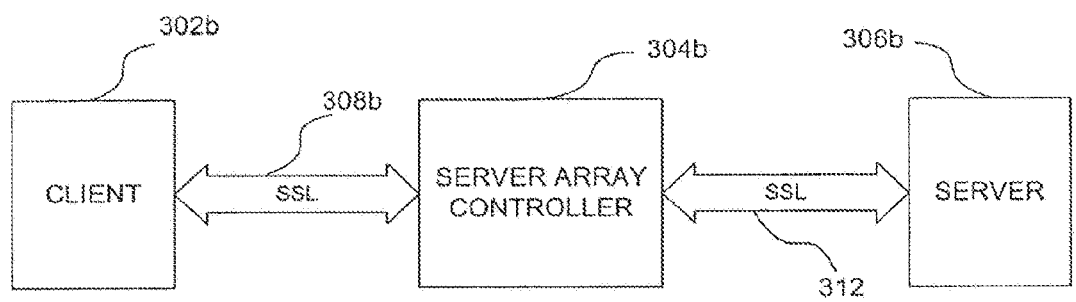
Figure 3C:
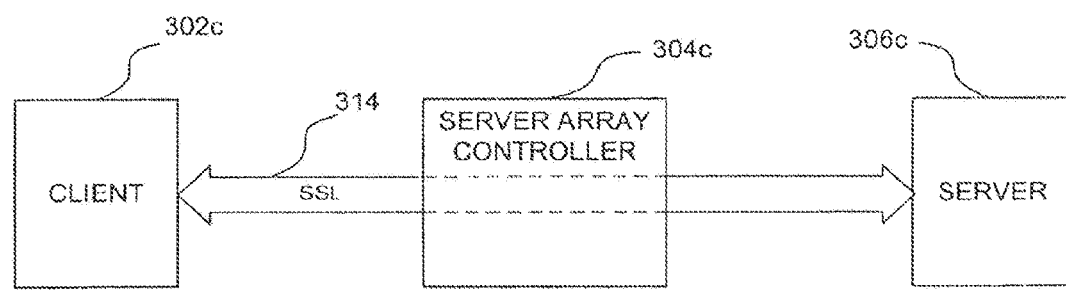

FIGS. 3A-C illustrate three ways in which a controller 304a-c can connect a client 302a-c with a server 306a-c. The controller 304a-c, the client 302a-c, and the server 306a-c may correspond to the controller 110, the client 102-104, and the servers 112-116, respectively of FIG. 1. In FIG. 3A, the controller 304a maintains one or more SSL sessions with the client 302a, represented by the SSL communication 308a. The controller 304a is referred to as the SSL server for these sessions. The client 302a is referred to as the SSL client for these sessions. As described in further detail below, the client 302a and the controller 304a engage in SSL handshakes, and transmit encrypted or unencrypted data back and forth over the SSL communication 308a during each SSL session.

The SSL protocol is one standard secure communications protocol that is commonly used for network communication. Alternative secure communication protocols can also be employed with the present invention. For discussion purposes, the SSL protocol is used as an example of possible secure communication protocols.

Data sent from the client 302a to the controller 304a that is intended for the server 306a is encrypted by the client 302a and decrypted by the controller 304a. It is then forwarded to the server 306a over an optionally secure communication (OSC) 310. As used herein, OSC refers to communication that can be encrypted or plaintext. Plaintext is ordinary unencrypted text and/or binary data. In this document, communication that is referred to as OSC can be plaintext or encrypted, or a combination of plaintext and encrypted data, in accordance with the invention.

When OSC includes encrypted data, the encryption mechanism used may be different than the encryption used for other encrypted data, such as encrypted data within the SSL protocol. For example, some or all OSC data can include data encrypted with a less secure or a lower cost encryption mechanism than is used within SSL. IPSecurity (IPSec) is an example of a protocol that can be used to provide security for an OSC communication.

Because the controller 304a has access to the unencrypted data, it is able to use this data to perform load balancing and persistence, in accordance with aspects of the invention, as described in further detail below. In one embodiment, some of the data is processed, and possibly modified by the controller prior to forwarding it to the server 306a. In one embodiment, some of the data might not be forwarded to the server.

In FIG. 3B, the controller 304b maintains one or more SSL sessions with the client 302b, represented by the SSL communication 308b. SSL sessions between the client 302b and the controller 304b are referred to as "client side" SSL sessions. Additionally, the controller 304b maintains one or more SSL sessions with the server 306a, as represented by the SSL communication 312. SSL sessions between the server 306a and the controller 304b are referred to as "server side" SSL sessions. In one embodiment, in the client side SSL sessions, the client 302b acts as the SSL client and the controller 304b acts as the SSL server. In one embodiment, the client 302b acts as the SSL server, and the controller 304b acts as the SSL client. In the server side sessions, in one embodiment, the controller 304b acts as the SSL client and the server 306b acts as the SSL server. In one embodiment, the controller 304b acts as the SSL server and the server 306b acts as the SSL client. In one embodiment, there is a one to one correspondence between client side SSL sessions and server side SSL sessions. In one embodiment, a server side SSL session can have multiple corresponding client side SSL sessions. In this embodiment, the controller 304b uses the server side SSL session to communicate data from the multiple client side SSL sessions.

Data sent from the client 302b to the controller 304b that is intended for the server 306b is encrypted by the client 302b and decrypted by the controller 304b. It is then reencrypted and forwarded to the server 306b over the SSL communication 312. Because the controller 304b has access to the decrypted data, it is able to use this data to perform load balancing and persistence, as described in further detail below. In one embodiment, the data is not reencrypted when sending it to the server 306b over the SSL communication 312. The SSL protocol allows data to be sent as plaintext within the SSL session, rather than encrypted. The controller 304b can modify data prior to forwarding. It may also "drop" some data—that is, not forward the data at all.

As discussed above, the SSL protocol is used herein as an example of secure communications protocols. It is to be noted that in exemplary configurations that include more than one secure communication protocol sessions, such as FIG. 3B, SSL may be used in one or more of the communication sessions. Multiple communication protocols may also be used. For example, in FIG. 3B, the two secure communication sessions represented by SSL communications 308b and 312 can use different secure communication protocols. IPSecurity (IPSec) is an example of a protocol that may be used instead of SSL in the SSL communication 312.

In FIG. 3C, the server 306c maintains one or more SSL sessions with the client 302c, represented by the SSL communication 314. In this configuration, the client 302c acts as the SSL client, and the server 306c acts as the SSL server. Data sent from the client 302c to the server 306c may pass through the controller 304c and be forwarded to the server 306c. The data is encrypted by the client 302c, remains encrypted when it is passing through the controller, and cannot be read by the controller if it does not have the proper session key.

Figure 4:
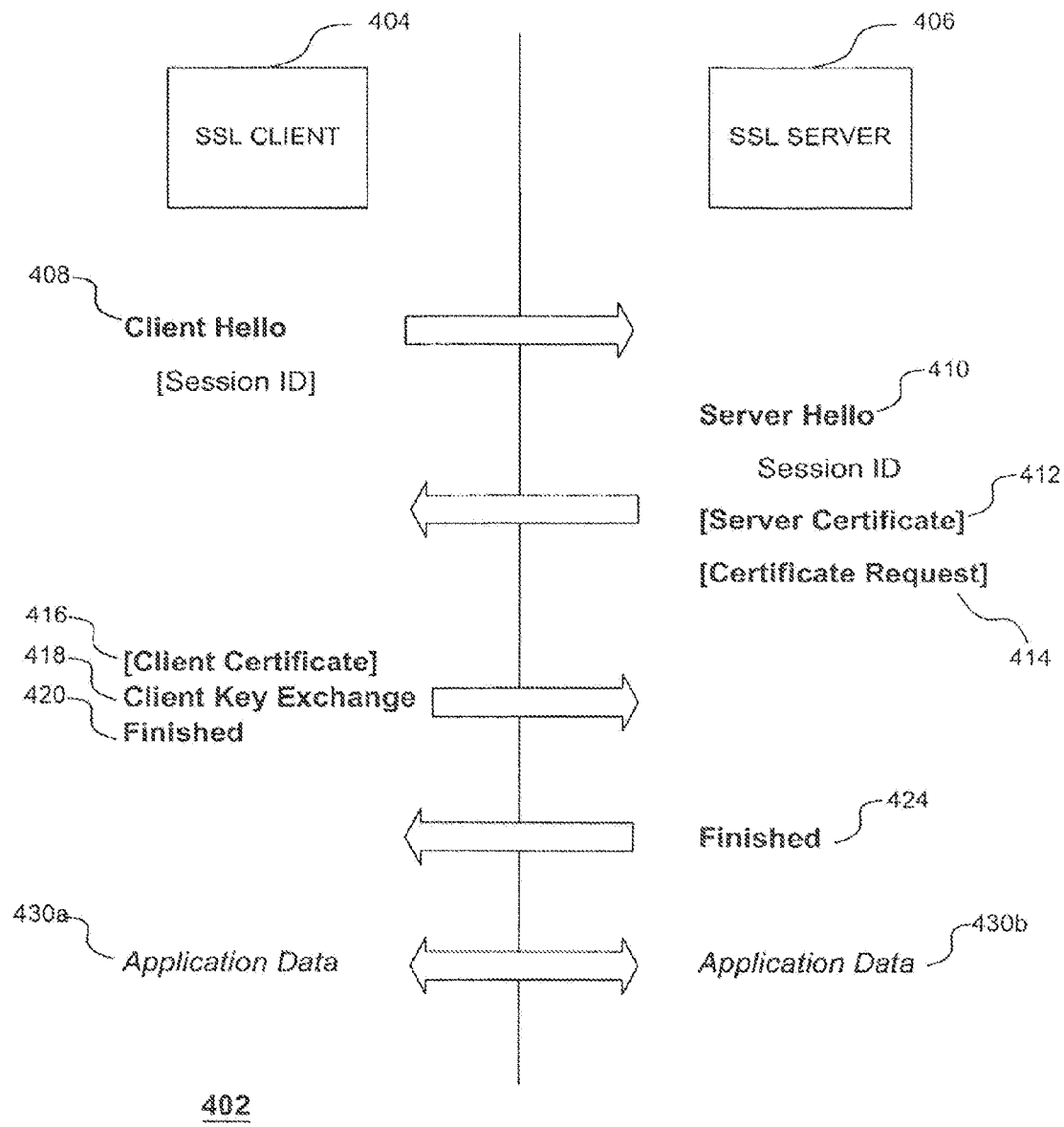
FIG. 4 illustrates an SSL client—SSL server message flow, in accordance with an SSL protocol.

The SSL protocol includes a protocol for performing a handshake between an SSL client and an SSL server. The handshake protocol allows the server and client to authenticate each other and to negotiate an encryption algorithm and cryptographic keys before the application protocol transmits or receives its first byte of data. RFC 2246, referred to above, describes this protocol in detail. FIG. 4 illustrates selected elements of the secure communication handshake protocol 402 that relate to the present invention.

As illustrated in FIG. 4, an SSL client 404 and an SSL server 406 implement a series of message transfers adhering to a secure communication handshake protocol 402. In an SSL session, one device is the SSL client and one device is the SSL server. In each of the SSL sessions illustrated in FIGS. 3A-C, either of the devices can act as the SSL client, with the other device in the same session acting as the SSL server.

As illustrated in FIG. 4, the SSL client 404 sends a "Client Hello" message 408 to the SSL server 406. The Client Hello message optionally includes an SSL session ID. If the SSL client desires to create a new session, it does not include a session ID. If the SSL client desires to resume a prior session or duplicate an existing session, it includes the session ID of the prior or existing session.

The SSL server 406 responds to the Client Hello message by sending a series of one or more messages. The "Server Hello" message 410 includes an SSL session ID that refers to the session being negotiated. If the SSL client attempted to resume or duplicate a session, and the server allows this, the returned session ID is the identifier of the resumed or duplicated session.

If the SSL client requested a new session, or if the SSL server does not allow resumption or duplication of the requested session, the session ID sent by the SSL server is an identifier of a new session. The SSL server can allow a new session without sending the session ID to the client, effectively preventing a client from resuming or duplicating the session. The SSL server also optionally sends a "Server Certificate" message 412 and a "Certificate Request" message 414.

If the SSL server sent a "Certificate Request" message, the SSL client 404 then sends a "Client Certificate" message, which includes a cryptographic certificate, such as the Internet X.509 public key certificate discussed above. The SSL client also sends a "Client Key Exchange" message 418 and a "Finished" message 420. The SSL server responds by sending a "Finished" message 424. Following reception of the "Finished" messages, the SSL client 404 and the SSL server 406 exchange application data 430*a-b* in a series of messages.

An abbreviated handshake protocol is specified in the SSL protocol. The abbreviated protocol applies when the SSL client desires to resume or duplicate a prior or existing session. In an abbreviated handshake, the "Certificate Request" message 414 and the "Client Certificate" message 416 might not be sent. In one embodiment, the "Certificate Request" message is sent in an abbreviated handshake. In one embodiment, the "Certificate Request" message is not sent. In one embodiment, the SSL client does not always send its client certificate in response to a "Certificate Request" message. The complete protocol, as described in the above-named reference, includes additional details not described herein.

Figure 5:
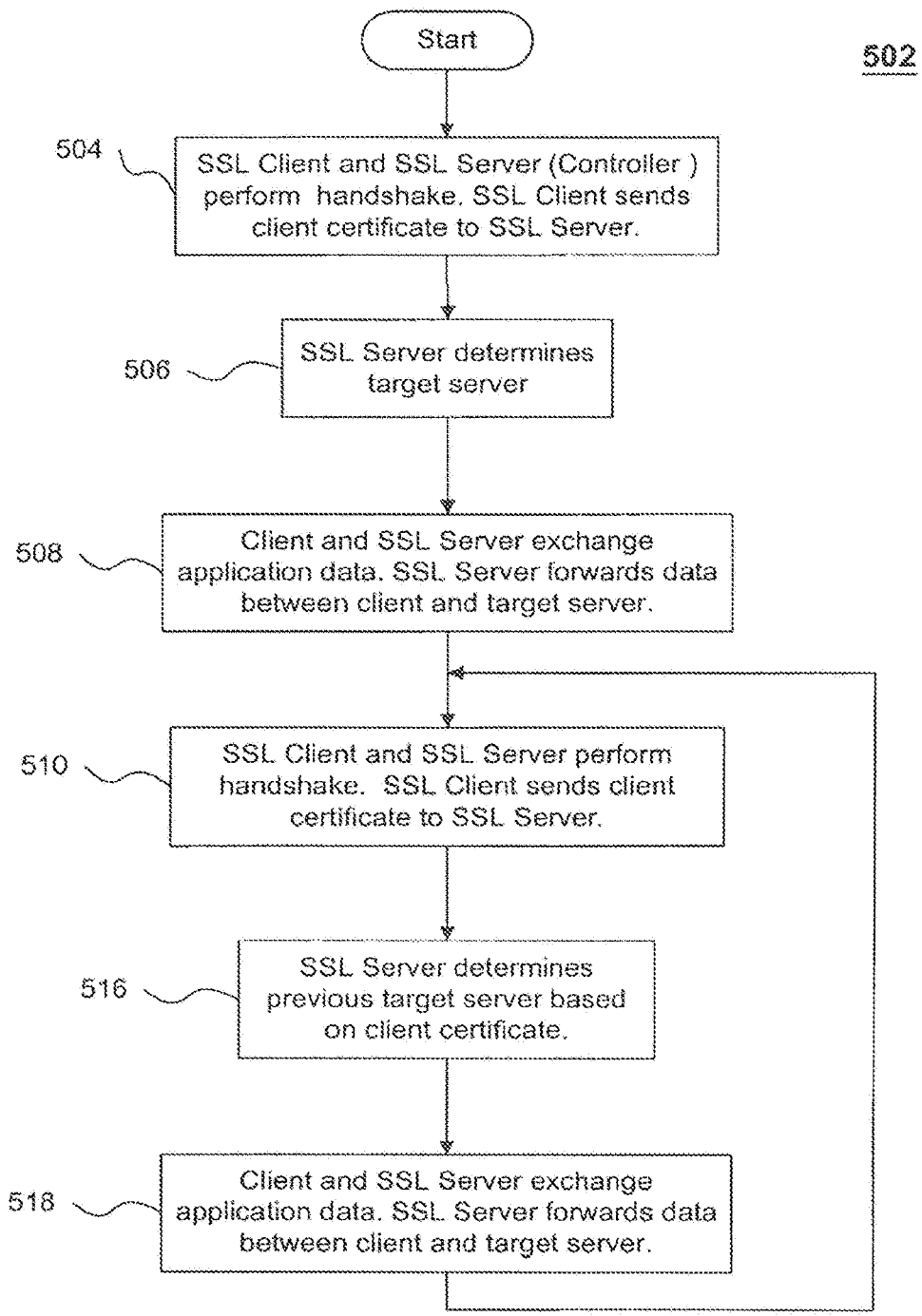
FIG. 5 is a flow chart illustrating a process for performing load balancing in accordance with the present invention.

FIG. 5 is a flow chart illustrating a process 502 for performing load balancing in accordance with the present invention. In one configuration employing the invention, a client 102 or 104 (FIG. 1) performs the role of an SSL Client, as discussed with reference to FIG. 4, and a controller 110 (FIG. 1) performs the role of an SSL Server. After beginning at a Start block, the process 502 proceeds to a block 504. At block 504, the client and the controller perform an SSL handshake. As discussed with reference to FIG. 4, the SSL handshake includes the client sending a client certificate associated with the client to the controller.

At a block 506, the controller determines a target from among the targets available to it. A target can be a target server, such as the servers 112-116 (FIG. 1). A target can also be a pool of servers, or another type of network device. In one embodiment, each target is a set of rules. For example, in one embodiment, the controller has a number of sets of rules. Each set of rules is used to process incoming data, and the present invention is employed to determine a set of rules. Functions or software objects can also be used to process the incoming data, and can be targets, in a similar manner.

The determination of a target at block 506 can be made using any of a number of load balancing algorithms, including random distribution, server load, URL parsing, and response time. In one embodiment, the determination is deterministic. That is, provided with the same input, such as the client certificate, the determination algorithm will always result in the same target. In one embodiment, the determination is performed using an algorithm, such as a hash function, that translates a certificate into a specification of a target. The use of hash functions is described in further detail below.

At a block 508, the client and the controller exchange application data. The controller performs as an intermediary between the client and the target, forwarding data received from the client to the target, and forwarding data received from the target to the client. In one configuration, as illustrated in FIG. 3A and the associated discussion above, the controller sends data to the target in plaintext, and receives data from the server in plaintext. In one configuration, as illustrated in FIG. 3B and the associated discussion above, the controller establishes a secure communication session with the target, and data is sent back and forth between the controller and the target within the secure communication session, in encrypted form. Data can also be sent between the controller and target using a secure communication protocol that differs from the secure communication protocol used between the client and the controller.

At a block 510, the client and the controller perform a second handshake. As discussed with reference to FIG. 4, the second SSL handshake includes the client sending a client certificate associated with the client to the controller. In one embodiment, the second handshake is performed by communicating within the first SSL session, so that the handshake itself is within a secure session. In one embodiment, the second handshake is performed outside of the first SSL session.

At a block 516, the controller determines which of the available servers 112-116 (FIG. 1) is the target previously selected at the block 506. In one embodiment, the determination of the target at the block 506 and the determination at the block 516 are performed using the same algorithm, such as a hash function, that translates a certificate into specification of a server.

A hash is a function or algorithm that maps a set of input values to a set of output values. A hash function can be used when the set of input values has more elements than the set of output values. Some hashes, when applied to a set of input values, will map the input values with approximate equal distribution on the set of output values. Other hashes will map the input values with uneven distribution on a set of output values. A hash is deterministic. That is, the hash will produce the same output value whenever a particular input value is hashed on. For example, the controller may perform a calculation of $$(\text{HASH}(\text{certificate})) \bmod N$$

where N is equal to the number of available servers, and where the resultant value is used to indicate one of the N available servers. With this calculation, the target determined at the block 516 will be the same as the target determined at the block 506, if the same hash function is used, N is unchanged and the same certificate is presented at both blocks. Therefore, the controller does not need to store information mapping the target with the client in order to correctly perform the determination at the block 516. In configurations where there is more than one controller receiving SSL handshakes with clients, having a mechanism where the mapping does not need to be stored simplifies the process of maintaining persistence on each controller.

In one embodiment of the invention, the process 502 further includes storing information that maps the client certificate with the target determined at the block 506. In this embodiment, at the block 516, the determination includes using the client certificate to retrieve the stored information specifying the target. For example, at the block 506, the controller can hash the client certificate, and store the mapping of the hash value and the target. At the block 516, the controller can hash the client certificate and retrieve the identification of the target mapped to the hash value. This mechanism is useful when the determination at the block 506 is at least partly based on information that is not constant.

Examples of this type of information are the load on each server, the response time of each server, and contents of a URL. In one embodiment, the determination at the block 506 uses a hash of the client certificate and also uses dynamic information, such as the load or response time of each server. In this embodiment, the mapping between the client certificate and the target can be stored, for example at the block 506, because at a later time the dynamic information may change.

At a block 518, the client and the controller exchange application data. As discussed above, the controller performs as an intermediary between the client and the target, forwarding data received from the client to the target, and forwarding data received from the target to the client. As discussed above, in one configuration, as illustrated in FIG. 3A and the associated discussion above, the controller sends data to the target in plaintext, and receives data from the server in plaintext. In one configuration, as illustrated in FIG. 3B and the associated discussion above, the controller establishes a secure communication session with the target, and data is sent back and forth between the controller and the target within the secure communication session, in encrypted form.

The actions at blocks 510-518 can be repeated a number of times, each time resulting in the determination of the same target as determined at the block 506.

In one embodiment, more than one client maintains a unified persistence with a target. This can occur, for example, in a configuration having a client certificate on a removable media, such as a smart card. With reference to FIGS. 1 and 5, at the block 504, a user can employ client 102 to perform a handshake, including sending a client certificate that is stored on a smart card communicating with client 102. At the block 510, the user can employ a second client, such as client 104, to perform a second handshake, including sending the same client certificate, the user having transferred the smart card to client 104. The second SSL session is created with the second client as the SSL client. Other aspects of the process 502 are as discussed above. In this way, the user is able to maintain a persistent connection with a target server, even when changing from the first client to the second client. The user can also use other mechanisms to transfer the client certificate, or a copy of the client certificate, from the first client to the second client.

In one embodiment, at the block 510, the SSL client sends a second client certificate that is not identical to the first client certificate sent by the client at the block 504. The first and second client certificates are equivalent, with respect to the process of determining a target. This may occur, for example, if a client certificate is made up of more than one component, and the hash function uses a subset of the components, called the hash components. If the hash components are identical, then the first and second client certificates are considered equivalent. A component can be any one or more bits within a bit string. Similarly, if a hash of the first client certificate always derives the same target as the second client certificate, both client certificates are considered equivalent with respect to the present invention. As used herein, the term "equivalent certificates" includes identical certificates. Also, an identical copy of a digital certificate is considered to be the same certificate as the original. Thus, after referring to a certificate, a subsequent reference to "the certificate" is satisfied if the second reference actually refers to a copy of the certificate.

Figure 6:
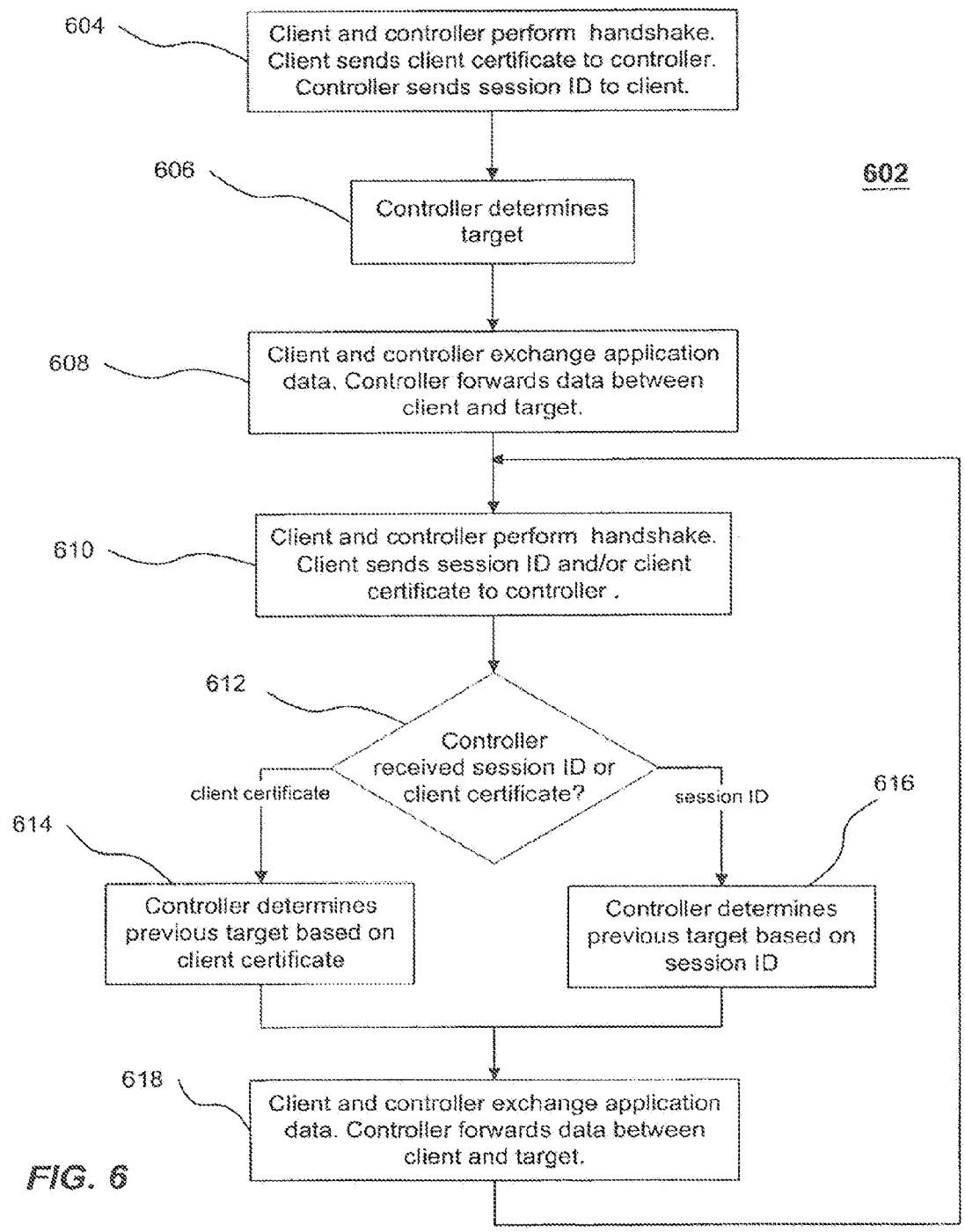
FIG. 6 is a flow chart illustrating a process for performing load balancing in accordance with one embodiment of the present invention.

FIG. 6 is a flow chart illustrating a process 602 for performing load balancing in accordance with an embodiment of the present invention, in which the client might not send a client certificate during certain SSL handshakes. The process 602 is similar to the process 502 discussed above, and much of the discussion regarding FIG. 5 applies to the process 602.

At a block 604, the client and the controller perform an SSL handshake. As discussed with reference to FIG. 4, the SSL handshake includes the client sending a client certificate associated with the client to the controller. At a block 606, the controller determines a target from among the targets, such as servers 112-116 (FIG. 1) available to it. The determination of a target can be performed before the SSL handshake of block 604, during the SSL handshake, or after the SSL handshake.

In one embodiment, the determination of the target is performed either before or during the SSL handshake, and the controller selects a session ID that identifies the determined target directly from the session ID—that is, without the use of dynamic stored mappings between session IDs and the targets. For example, the controller can select a session ID such that the target can be derived directly from a computation on the session ID. The use of a static table associating hash values with targets, together with a selection of a session ID that hashes to one of the hash values in the table, is considered to be a technique that allows direct determination of the target from the session ID, because the table does not need to be dynamically updated to accommodate new session IDs. This allows the controller to use any of a number of algorithms for determining the target, and subsequently derive the target from the session ID without having to store mappings between session IDs and target.

At a block 608, the client and the controller exchange application data. The controller performs as an intermediary between the client and the target, as discussed above. The controller and the target can communicate using plaintext or encrypted messages.

At a block 610, the client and the controller perform a second handshake. In this handshake, the client might not send a client certificate associated with the client to the controller. For example, the second handshake can be setting up a resumed session. When the client desires to resume an SSL session, it sends to the controller a session ID of a prior session. In this case, the client might not send a client certificate during the handshake. In another example, the client may desire to duplicate an existing session, by sending the controller a session ID of an existing session. As for the resumed session, the client might not send a client certificate during the handshake, when duplicating an SSL session. Therefore, the client may send the session ID, the client certificate, or both, to the controller.

At a block 612, the controller determines whether it has received the session ID or the client certificate during the second handshake. If the controller has received the client certificate and not the session ID, process flow proceeds to a block 614. If the controller has received the session ID and not the client certificate, process flow proceeds to a block 616. If the controller has received both the session ID and the client certificate during the second handshake, process flow can proceed to either one of the block 614 or the block 616.

At a block 614, the controller determines which of the available targets, such as servers 112-116 (FIG. 1) is the target previously selected at the block 606, the determination being based on the client certificate. In one embodiment of the invention, the process 602 includes storing information that maps the session ID with the target determined at the block 606. At the block 614, the determination might include using the session ID to retrieve the information specifying the target. In one embodiment, for example, at the block 606, the controller can hash the client certificate, and store the mapping of the hash value, the session ID, and the target server. At the block 612, the controller can retrieve the identification of the target mapped to the session ID.

At a block 618, the client and the controller exchange application data. As discussed above, the controller performs as an intermediary between the client and the target, forwarding data received from the client to the target, and forwarding data received from the target to the client.

If, at the decision block 612, it is determined that a session ID is received, and the session ID is to be used to determine the previous target, flow proceeds to a block 616. At the block 616 the controller determines the target based on the session ID. In one embodiment, the process 602 includes storing a mapping between a session ID, a client certificate (or a hash of the client certificate), and the target, after the target has been determined at the block 606. In this embodiment, the block 616 can include the controller using the session ID to retrieve the mapping, and to determine the previous target. In one embodiment, the process 602 includes storing a mapping between a session ID and a client certificate, and the target is determined from the client certificate. In this embodiment, the block 616 includes using the session ID to retrieve the mapping, and then identifying the target based on the certificate.

Flow then proceeds to the block 618, where the client and the controller exchange application data. As discussed above, in one embodiment, a session ID is selected that identifies the target. In this embodiment, at the block 616, the target can be identified from the session ID, without having stored mappings.

The actions at blocks 610-618 can be repeated a number of times, each time resulting in the determination of the same target as determined at the block 606. During a series of persistent transactions between a client and a target, the process can proceed through either block 614 or 616, resulting in various combinations of determination techniques.

In one embodiment, at the decision block 612, if neither the client certificate nor the session ID are available, flow can proceed to another determination block (not shown), where the controller determines the previous target based on a third type of identifying data. For example, the IP address, the combination of IP address and port number of the client, or other information can serve to identify the client and to connect the packet with a prior client certificate, in order to determine the previous target. If a new SSL session is initiated within an existing SSL session, the handshake at block 610 may be performed within the existing SSL session. In this situation, the TCP connection underlying the SSL session may be used to connect the packet with the prior client certificate and identify the previous target.

In one embodiment of the invention, the process 602 includes storing information that maps the client IP address and port number with the target determined at the block 606. In this embodiment, the controller can determine the previous target using the client IP address to retrieve the information specifying the target. In one embodiment, for example, at the block 606, the controller can hash the client certificate, and store the mapping of the hash value, the source IP address plus port number, and the target.

As can be understood by the above discussion, in some embodiments, the process 602 includes receiving at least two identifiers associated with the client, where the identifiers can be a client certificate, a session ID, an IP address plus port number, a TCP connection, HTTP cookie information, or other data. A mapping of the two or more identifiers is stored, for later retrieval to determine the previous target. It is to be noted that some identifiers can be transitory. For example, a TCP connection is only valid for the duration of the TCP connection. It may be useful during this time to identify a client and to determine a target for a client when the client certificate is unavailable.

In one embodiment, at the decision block 612, if the client certificate is not available the controller may elect to not perform persistence on the second handshake. In this embodiment, the controller can determine the target in the same manner as discussed above with reference to the block 606, or use a different target selection mechanism. In this situation, a target that is different from the prior target can be selected.

The above discussion includes different ways in which the client certificate can be used to maintain persistence. These ways include, in addition to using the client certificate, using the session ID, the client IP address plus port number, a TCP connection, or HTTP cookie information, and breaking persistence when the client certificate is not available. It should be noted that the present invention can be employed with anyone or any combination of these different techniques, and other load balancing and persistence algorithms not described.

The functions and components of controller 110 (FIG. 1) can have a number of possible architectures. FIGS. 7A-D are block diagrams illustrating some configurations of traffic management systems implementing the functions of the controller 110 in accordance with the invention. Additional configurations can also be employed when practicing the current invention. Each of the components in FIGS. 7A-D can comprise a network device, such as the network device 200 (FIG. 2), and can include a subset of the components illustrated in FIG. 2. Each of the components illustrated in FIGS. 7A-D can comprise a software process, a software thread, a CPU and associated software, a blade, or other combinations of hardware and/or software sub-components.

As illustrated in FIG. 7A, the traffic management system 702 includes an SSL proxy 704 and a persistence engine 706. The SSL proxy 704 receives encrypted messages 708 from client devices, decrypts the messages, and sends OSC messages 710 to the persistence engine. As discussed above, OSC data refers to data that can be plaintext or encrypted data. Implementing OSC data as encrypted data in communication between physical devices provides an additional amount of security. The SSL proxy 704 performs SSL handshakes as discussed above. It can act as an SSL client or an SSL server in any SSL session. The persistence engine can use the decrypted messages, the client certificates, the session IDs, or any combination of these, to perform load balancing and to maintain persistent connections with target servers. The persistence engine 706 sends OSC messages 712 to the target servers. The traffic management system 702 of FIG. 7A corresponds to the controller 104a of FIG. 3A.

FIG. 7B illustrates a configuration of a traffic management 720 having an incoming SSL proxy 722, an outgoing SSL proxy 726, and a persistence engine 724. The incoming SSL proxy 722 receives encrypted messages 728 from client devices, and performs the operations discussed above regarding SSL proxy 704, including sending OSC messages 730 to the persistence engine 724. The persistence engine performs the operations discussed above regarding persistence engine 706, but sends OSC messages 732 to the outgoing SSL proxy 726 instead of directly to the target servers. The outgoing SSL proxy establishes SSL sessions with target servers, encrypts messages, and sends the encrypted messages 734 to the target servers. The load balancing system 720 of FIG. 7B corresponds to the controller 304b of FIG. 3B.

FIG. 7C illustrates a configuration of a load balancing system 740 having an SSL proxy 742 and a persistence engine 744. The SSL proxy 742 receives encrypted messages 746 from client devices, and performs the operations discussed above regarding SSL proxy 704. The SSL proxy 742 sends OSC messages 748 to the persistence engine 744. The persistence engine 744 performs the operations discussed above regarding persistence engine 706, but sends OSC messages 748 to SSL proxy 742. SSL proxy 742 performs SSL handshakes with target servers, encrypts messages, and sends the encrypted messages 752 to the target servers. SSL proxy 742 can also send some or all messages as plaintext messages 750 to anyone or more target servers. The determination of when plaintext messages are sent and when encrypted messages are sent by the SSL proxy 742 to the target servers is configurable. The determination can be based on one or more criteria, including the type of message, the content of the message, the target server, and other user-specified criteria. Additionally, persistence engine 744 can send some OSC messages to target servers without going through the SSL proxy 742.

In one variation of FIG. 7C, SSL proxy 742 does not send the message received from the client to the persistence engine 744, but sends the information that the persistence engine 744 uses to perform its actions. Specifically, the SSL proxy 742 sends the client certificate and/or the session ID to the persistence engine. The persistence engine determines the target server and sends the result of this determination back to the SSL proxy 742. The SSL proxy then uses the identification of the target server to send the message to the appropriate target server. In one embodiment, the communication of the persistence information and target server determinations between SSL proxy 742 and persistence engine 744 is performed out of band, through a proprietary network or communication protocol, or by proprietary extensions to standard network protocols. For example, the persistence information can be embedded in the initial SYN packet of a TCP handshake between the SSL proxy 742 and the persistence engine 744. The identification of the target server can then be returned by the persistence engine to the SSL proxy.

FIG. 7D illustrates a configuration of a load balancing system 760 having an SSL proxy 762 and a persistence engine 764. The persistence engine 764 receives encrypted messages 766 from client devices, and forwards the messages (arrow 768) to the SSL proxy 762. SSL proxy 762 performs the operations discussed above regarding SSL proxy 704, sending OSC messages 772 to the persistence engine 764. The persistence engine 724 performs the operations discussed above regarding persistence engine 706. It then sends OSC messages 774 to the target servers. In one variation of FIG. 7D, after processing OSC messages 772, the persistence engine 764 sends the OSC to SSL proxy 762, or to a second SSL proxy (not shown) for reencryption. The reencrypted messages are then sent to the target server, either by the SSL proxy or by the persistence engine. As discussed above, with reference to FIG. 7C, the communication of the persistence information and target server determinations between the SSL proxy 762 and persistence engine 764 can be performed out of band, through a proprietary network or communication protocol, or by proprietary extensions to standard network protocols.

Figure 8:
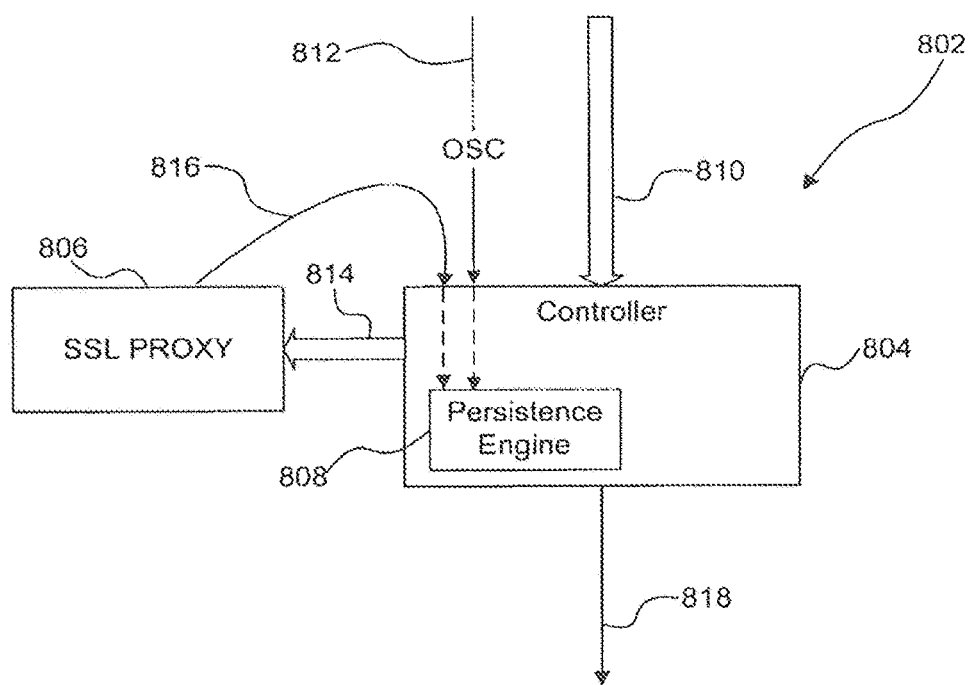
FIG. 8 is a block diagram illustrating a configuration in which the invention may be practiced.

FIG. 8 illustrates a configuration of a load balancing system 802 that includes additional aspects of the invention. The load balancing system 802 of FIG. 8 includes a controller 804 and an SSL proxy 806. The controller 804 includes a persistence engine 808. The controller 804 receives encrypted messages 810 and OSC messages 812 from client devices (not shown). In one embodiment, OSC messages 812 include HTTP messages that include information used for maintaining persistent communications with target servers. The information can include a value that uniquely corresponds to the client device, such that it can be used as a client identifier. The persistence engine 808 uses this information to maintain persistence in accordance with the teachings of the present invention. In one embodiment, the information is included in an HTTP cookie. For example, in one embodiment, when the controller first determines a target server for the client, the persistence engine stores a mapping between the client identifier and the target server. In subsequent messages, the persistence engine determines the target server based on the client identifier and the stored mapping.

As illustrated in the exemplary embodiment of FIG. 8, when the controller 804 receives an encrypted message 810 from a client, it sends the message to the SSL proxy 806, as shown by message 814. The SSL proxy 806 decrypts the message, and sends the message as OSC message 816 back to the controller 804. The SSL proxy '806 also inserts a unique value corresponding to the client in an HTTP cookie, as part of the OSC messages 816 sent to the controller. The unique value can be the client certificate, or an algorithmic derivation of the client certificate, such as a hash of the certificate. In one embodiment, the SSL proxy 806 stores a mapping between each client certificate and a corresponding session ID for the SSL session with the client. This association is available during the SSL handshake session between the SSL proxy 806 and the client device. In subsequent handshakes that include a session ID and not a client certificate, the SSL proxy 806 uses the stored mappings to determine the corresponding client certificate, and stores the same unique value in the HTTP cookie as previously stored in a prior handshake. During a handshake that includes a client certificate and a new session ID, the SSL proxy stores the new association. For example, when an SSL session is resumed, the client can send a session ID and not send the client certificate. When a client begins a new SSL session without resuming a prior session, the SSL proxy receives the client certificate and the new session ID. In this manner, the persistence engine does not need to be concerned with the details of SSL handshakes, and does not need to have a specific knowledge of certificates and session IDs.

The persistence engine 808 receives the OSC messages 816 and processes it in accordance with the teachings of the present invention. The controller 804 sends OSC messages 818 to the target server. In one embodiment, the persistence engine 808 processes the messages 816 by using the unique value in the HTTP cookie as a client identifier, in order to associate the client with a corresponding target server. Techniques for inserting client certificates and/or session IDs in HTTP cookies can also be employed in the various configurations illustrated in FIGS. 7A-D.

In one embodiment, the SSL proxy 806 stores client certificates (or algorithmic derivatives of the certificate) and session IDs in one or more predetermined HTTP headers that the persistence engine, or other component of the controller, recognizes. For example, the predetermined HTTP headers can include header names such as SSLInitialSessionID, SSLCurrentSessionID, SSLClientCertificate, and SSLClientCertificateHash. In this embodiment, the SSL proxy 806 does not store mappings between the client certificate and the session ID. Instead, the persistence engine (or an associated component) stores the mappings, in order to maintain persistence based on these values.

In the exemplary embodiments illustrated in FIGS. 7A-D and 8, the persistence engine is discussed as performing both the functions of maintaining persistence and of load balancing. In each of these embodiments, and in other embodiments not shown, the functions of persistence and load balancing can be separated among different processes or separate physical devices.

Figure 9:
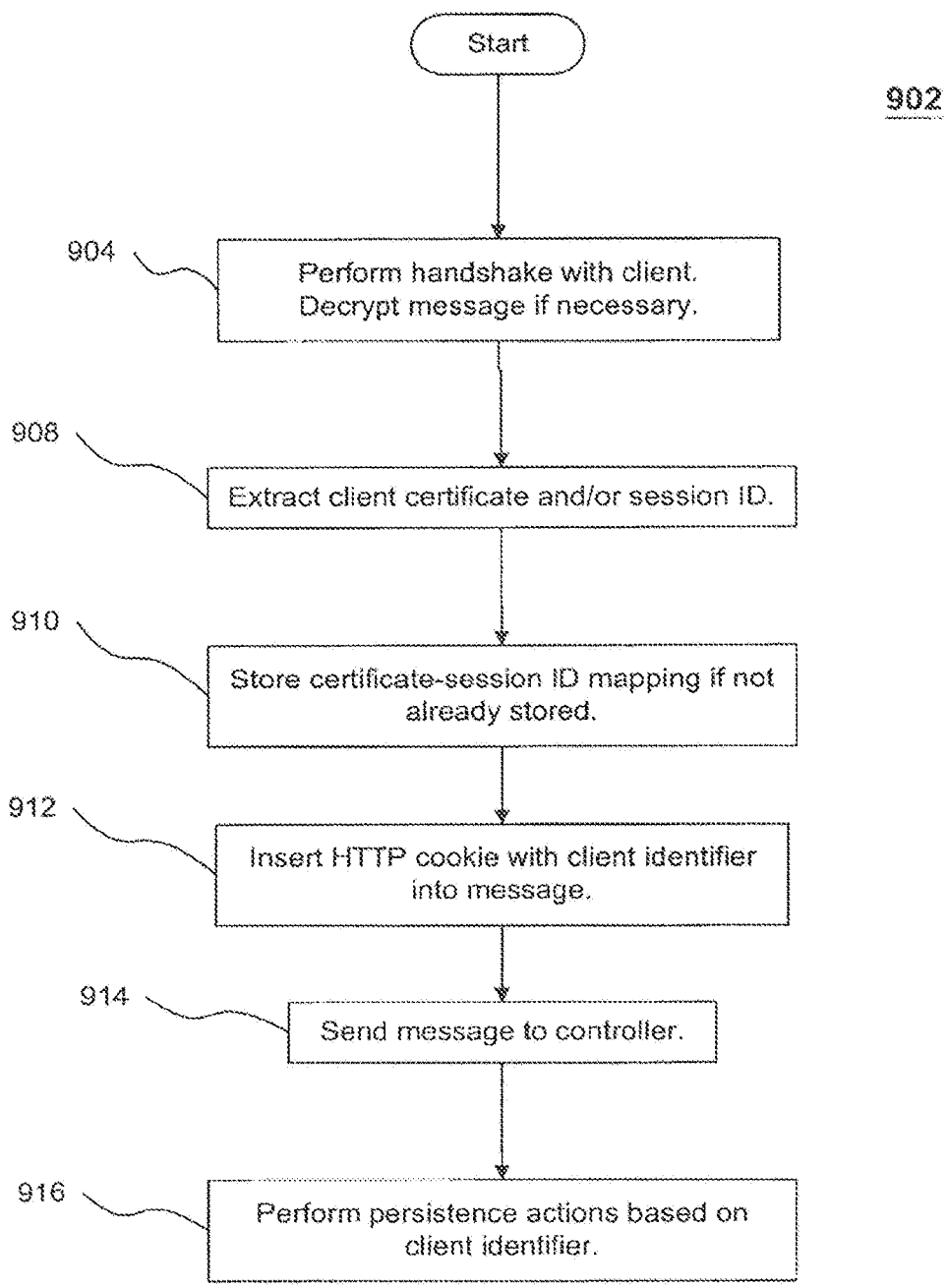
FIG. 9 is a flow chart illustrating a process for performing load balancing in accordance with the present invention.

FIG. 9 illustrates a process 902 for using HTTP cookies in combination with client certificates and session IDs to maintain persistence. After the start box, at a box 904, an SSL proxy, such as SSL proxy 806 (FIG. 8), performs an SSL handshake with a client device, such as client 102 or 104 (FIG. 1). The SSL proxy decrypts any handshake messages that require decryption. As discussed above, in some situations, the entire handshake is performed within an SSL session, and all messages are encrypted. In other situations, some, or possibly all, messages are received as OSC messages.

At a box 908, the SSL proxy extracts a client certificate, a session ID, or both, from the handshake. This can include the situation where a session ID is sent from the SSL proxy to the client, in which case the SSL proxy is originating the session ID.

At a box 910, a mapping between the client certificate and the session ID is stored by the SSL proxy. This action is performed if the handshake involves both values, and the mapping is not already stored. In handshakes where only a certificate or only a session ID is transferred, this action is not performed.

At a box 912, the SSL proxy inserts an HTTP cookie with a client identifier in an HTTP message to be sent to the controller. As discussed above, the client identifier can be the client certificate or an algorithmic derivative of the client certificate. If the handshake includes receiving the session ID and not the client certificate from the client, the SSL proxy may need to retrieve the client certificate (or client identifier) from a previously stored mapping.

At a box 914, the SSL proxy sends a message to the controller 804 (FIG. 8), the message including the HTTP cookie. At a block 916, the controller (and more specifically, the persistence engine 808) performs persistence actions based on the client identifier in the HTTP cookie. The persistence actions may include using the client identifier to determine the target server corresponding to the client, as well as other persistence actions described herein.

As discussed above in the text accompanying FIG. 8, in one embodiment, at box 910, the action of storing a mapping between the client certificate and the session ID is performed by the persistence engine, and not the SSL proxy. In this embodiment, at the box 912, the SSL proxy inserts the client certificate, the session ID, or both, in an HTTP cookie or in designated HTTP headers.

In one embodiment, the process 902 is performed without using the session ID to maintain persistence. The source IP address and port number, or other information, may be used to handle situations where the client certificate is unavailable, as discussed above. In one embodiment, if the client certificate is unavailable, persistence is not maintained, and the client is connected with a different target server.

Figure 10:
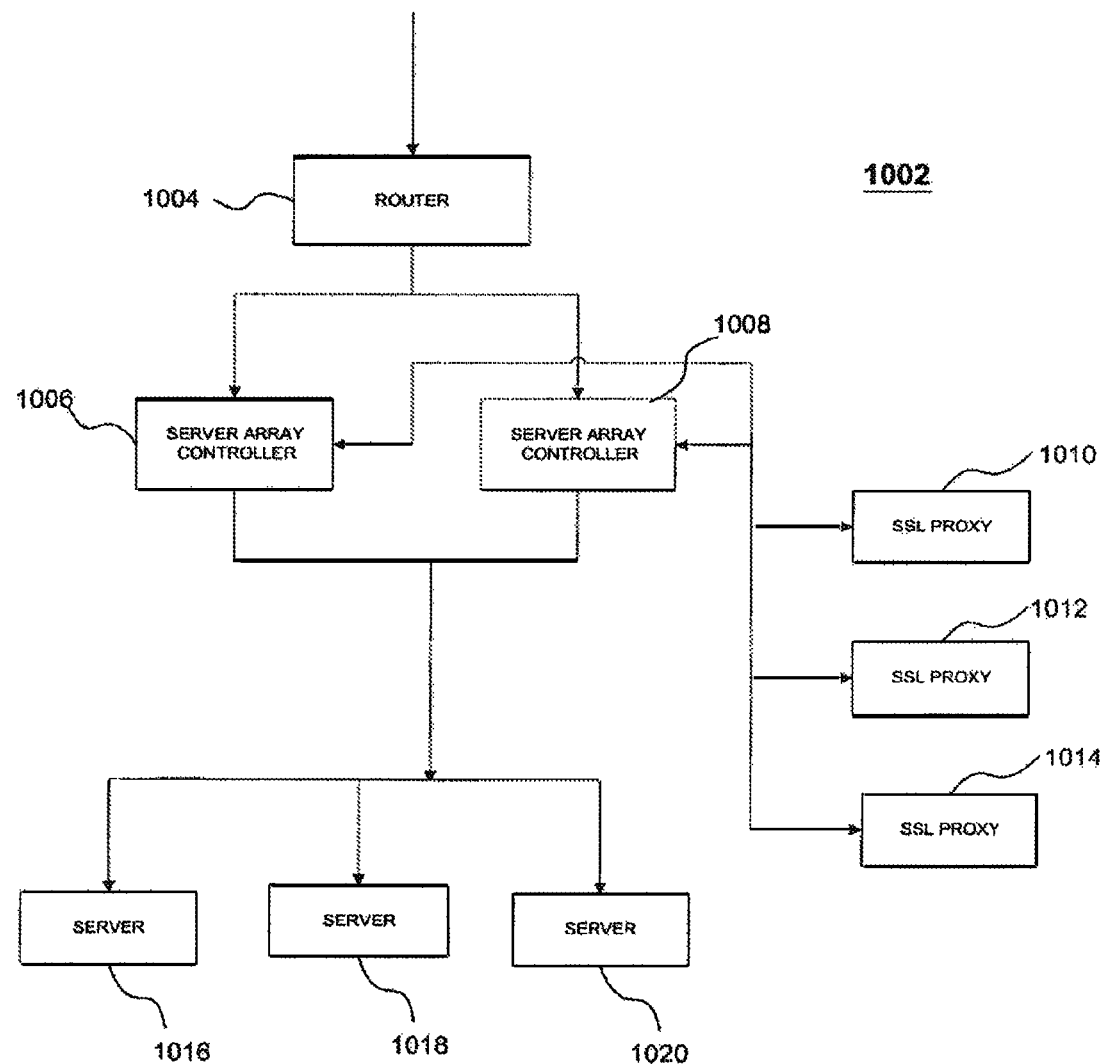
FIG. 10 is a block diagram illustrating a configuration in which the invention may be practiced.

FIG. 10 illustrates a configuration of a load balancing system 1002 in accordance with an embodiment of the present invention. As illustrated in FIG. 10, a router 1004 receives messages from one or more client devices (not shown). The load balancing system 1002 includes two controllers 1006 and 1008, and three SSL proxies 1010-1014. The router 1004 forwards each message from the client devices to one of the controllers 1006-1008. In one embodiment, one controller is selected as the active controller, and the second controller is selected as the backup controller. In normal operation, the router directs all messages received from client devices to the active controller. If the active controller fails, or another problem is detected, the backup controller takes on the role of active controller, and the router directs subsequent messages to the backup (now active) controller. In one embodiment, both controllers are active controllers.

When a controller 1006 or 1008 receives a client message, if the message is part of a connection handled by an SSL proxy, the message is forwarded to one of the SSL proxies 1010-1014. The controller may use a load balancing algorithm to determine which of the SSL proxies to direct messages to. The SSL proxy receiving the message processes the message. If the message requires forwarding to a target server 1016-1020, the SSL proxy sends the decrypted message back to the controller, which then forwards the message to the appropriate target server. The controller performs load balancing to determine the proper target server the first time. For subsequent messages, the controller maintains persistence by using the client certificate and/or session ID, as previously discussed.

As discussed with reference to FIGS. 8 and 9, the SSL proxies 1010-1014 can send the client certificate (or an algorithmic derivation of the certificate) and/or the session ID to the controller using an HTTP cookie or a designated HTTP header.

In one embodiment, the controller 1006 or 1008 sends messages to one of the SSL proxies 1010-1014 to be reencrypted and forwarded to the target server. The SSL proxy used for a server side SSL session does not need to be the same SSL proxy used for the corresponding client side SSL session.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A blade device, comprising:
   one or more interface devices for communicating information to and from the blade device; and
   one or more processors operable to execute executable instructions to perform actions, comprising:
      receiving from a client device a first message;
      in response, establishing a first secure communications session with the client device by performing a first security handshake with the client device, the first security handshake including a first client certificate received from the client device, the first security handshake employing a first secure communications protocol;
      associating a communications with the client device to a target server;
      receiving a second message from the client device, the second message including a second client certificate associated with the client device that is equivalent to the first client certificate, the second message being a second security handshake with the client device;
      in response, establishing a second secure communications session with the client device by performing a second security handshake with the client device that employs a second secure communications protocol; and
      identifying the target server for a second communications with the client device based on the second client certificate, the second client certificate including a public key security certificate.

2. The blade device of claim 1, wherein the first secure communications protocol and the second secure communications protocol comprises at least one of an Internet Protocol (IP) Security (Sec) protocol, a Secure Sockets Layer (SSL) protocol, or a Transport Layer Security Protocol (TLS), and wherein the first secure communications protocol and the second secure communications protocol are different communications protocols.

3. The blade device of claim 1, wherein the second security handshake is received within the first secure communications session with the client device.

4. The blade device of claim 1, wherein the one or more processors are operable to store data indicating a mapping between at least one of the first or the second client certificates and a session identifier.

5. The blade device of claim 1, wherein communications between the target server and the blade device are configured such that there is a one to one correspondence between each client side secure communications session and target server communications sessions.

6. The blade device of claim 1, wherein communications between the target server and the blade device are configured such that each of the secure communications sessions with the client device is directed towards a same secure communications session between the target server and the blade device.

7. The blade device of claim 1, wherein the second secure communications session is directed towards resuming the first secure communications session, and wherein a session identifier is provided in with the second received message for use in establishing the second secure communications session.

8. A system, comprising:
a plurality of server devices; and
one or more processor devices interposed between a client device and the plurality of server devices, the processor devices perform actions, including:
receiving from the client device a first message;
in response, establishing a first secure communications session with the client device by performing a first security handshake with the client device, the first security handshake including a first client certificate received from the client device, the first security handshake employing a first secure communications protocol;
associating a communications with the client device to a target server within the plurality of server devices;
receiving a second message from the client device, the second message including a second client certificate associated with the client device that is equivalent to the first client certificate, the second message being a second security handshake with the client device;
in response, establishing a second secure communications session with the client device by performing a second security handshake with the client device that employs a second secure communications protocol; and
identifying the target server for a second communications with the client device based on the second client certificate, the second client certificate including a public key security certificate.

9. The system of claim 8, wherein the one or more processor devices perform actions, further including:
decrypt messages received from the client device over the first or second secure communications sessions; and
maintaining a persistent connection to the target server for the client device over which to send the decrypted messages.

10. The system of claim 8, wherein the first secure communications protocol and the second secure communications protocol comprises at least one of an Internet Protocol (IP) Security (Sec) protocol, a Secure Sockets Layer (SSL) protocol, or a Transport Layer Security Protocol (TLS), and wherein the first secure communications protocol and the second secure communications protocol are different communications protocols.

11. The system of claim 8, wherein the second security handshake is received within the first secure communications session with the client device.

12. The system of claim 8, wherein the one or more processors are operable to store data indicating a mapping between at least one of the first or the second client certificates and a session identifier.

13. The system of claim 8, wherein communications between the target server and the blade device are configured such that there is a one to one correspondence between each client side secure communications session and target server communications sessions.

14. The system of claim 8, wherein communications between the target server and the blade device are configured such that each of the secure communications sessions with the client device is directed towards a same secure communications session between the target server and the blade device.

15. An apparatus having stored thereon computer-executable instructions that when installed on a computing device having one or more processors, performs actions, comprising:
receiving from a client device a first message;
in response, establishing a first secure communications session with the client device by performing a first security handshake with the client device, the first security handshake including a first client certificate received from the client device, the first security handshake employing a first secure communications protocol;
associating a communications with the client device to a target server;
receiving a second message from the client device, the second message including a second client certificate associated with the client device that is equivalent to the first client certificate, the second message being a second security handshake with the client device;
in response, establishing a second secure communications session with the client device by performing a second security handshake with the client device that employs a second secure communications protocol; and
identifying the target server for a second communications with the client device based on the second client certificate, the second client certificate including a public key security certificate.

16. The apparatus of claim 15, wherein the second secure communications session is directed towards resuming the first secure communications session, and wherein a session identifier is provided in with the second received message for use in establishing the second secure communications session.

17. The apparatus of claim 15, wherein communications between the target server and the blade device are configured such that each of the secure communications sessions with the client device is directed towards a same secure communications session between the target server and the blade device.

18. The apparatus of claim 15, wherein communications between the target server and the blade device are configured such that there is a one to one correspondence between each client side secure communications session and target server communications sessions.

19. The apparatus of claim 15, wherein the second security handshake is received within the first secure communications session with the client device.

20. The apparatus of claim 15, wherein the first secure communications protocol and the second secure communications protocol are different communications protocols.

* * * * *